United States Patent
Ko et al.

(10) Patent No.: US 11,780,937 B2
(45) Date of Patent: Oct. 10, 2023

(54) METHOD FOR EXTRACTING POLYSACCHARIDES

(71) Applicant: Nano and Advanced Materials Institute Limited, Hong Kong (CN)

(72) Inventors: Chun Hay Ko, Hong Kong (CN); Chun Fai Ng, Hong Kong (CN); Ying Ying Ng, Hong Kong (CN); Simon Hoi Pang Sung, Hong Kong (CN); Zack Chun Fai Wong, Hong Kong (CN)

(73) Assignee: Nano and Advanced Materials Institute Limited, Hong Kong (CN)

( * ) Notice: Subject to any disclaimer, the term of this patent is extended or adjusted under 35 U.S.C. 154(b) by 0 days.

(21) Appl. No.: 17/663,456

(22) Filed: May 16, 2022

(65) Prior Publication Data
US 2022/0389122 A1    Dec. 8, 2022

Related U.S. Application Data

(60) Provisional application No. 63/202,149, filed on May 28, 2021.

(51) Int. Cl.
C08B 37/00 (2006.01)

(52) U.S. Cl.
CPC ...... C08B 37/0003 (2013.01); C08B 37/0024 (2013.01)

(58) Field of Classification Search
CPC .......... C08B 37/0003; C08B 37/0024
See application file for complete search history.

(56) References Cited

FOREIGN PATENT DOCUMENTS

CN    110655587 A    1/2020

OTHER PUBLICATIONS

Hsu et al., Carbohydrate Polymers, 2013, 92, p. 297-306. (Year: 2013).*
Maeng et al., Journal of Food Process Engineering, 2017, 40(2), e12421, 8 pgs. (Year: 2017).*
Yang et al., Trends in Food Science & Technology, 2021, 112, p. 50-57, Available online Apr. 1, 2021. (Year: 2021).*
Wang et al., Innovative Food Science and Emerging Technologies, 2020, 65, 102447, 10 pages. (Year: 2020).*
Hang Lin et al., "Optimization of Pressurized Microwave-Assisted Aqueous Two-Phase Extraction of Polysaccharides from Lentinula Edodes with Orthogonal Test", Pharmacy Today, vol. 25, No. 8, pp. 564-568.
Bao-liang Liu et al.,"Study on Extraction Process of Polysaccharide from Laminaria japonica Aresch.by Ultrasonic-Aqueous Two Phase System Assisted Extraction", Journal of Anhui Agricultural Sciences, 2010 38(31), 17445-17447.
Hu Jiaqin et al., "Application of two-phase extraction in natural product extraction", Heilongjiang Animal Husbandry and Veterinary Medicine, No. 1, pp. 86-89.
"Biochemistry", 3rd edition, edited by Wu Wutong, pp. 101-102, China Medical Science and Technology publishing house.
Zhenyu Chenga et al., "Simultaneous extraction and purification of polysaccharides fromGentiana scabra Bunge by microwave-assisted ethanol-salt aqueoustwo-phase system", Industrial Crops and Products 102 (2017) 75-87.
First Office Action of CN2022105218676 issued from the China National Intellectual Property Administration dated May 31, 2023.

\* cited by examiner

*Primary Examiner* — Jonathan S Lau
(74) *Attorney, Agent, or Firm* — S&F/WEHRW

(57) ABSTRACT

Provided herein is a method for extracting polysaccharides, for example, β-glucan and sodium alginate, from a sample including a botanical product. The extraction can be carried out using a microwave assisted dual-solvent extraction followed by one or more membrane filtration steps.

7 Claims, 38 Drawing Sheets

| Sample | EtOH % | Conc. of carbohydrates in sample (%) [20 min extraction] |
|---|---|---|
| YZ | 19 | 2.75 |
| | 21 | 2.80 |
| | 23 | 2.59 |
| | 25 | 2.44 |
| | 27 | 2.28 |
| QDC | 19 | 2.17 |
| | 21 | 1.69 |
| | 23 | 1.45 |
| | 25 | 1.28 |
| | 27 | 1.16 |
| MK | 19 | 13.61 |
| | 21 | 12.05 |
| | 23 | 12.05 |
| | 25 | 11.65 |
| | 27 | 12.08 |

FIG. 6

| Sample | EtOH % | AS % | Conc. of carbohydrates in sample (%) [20 min extraction] |
|---|---|---|---|
| YZ | 21 | 20 | 1.93 |
| | 21 | 21 | 1.94 |
| | 21 | 22 | 1.83 |
| | 21 | 23 | 1.73 |
| QDC | 19 | 21 | 1.25 |
| | 19 | 22 | 1.29 |
| | 19 | 23 | 1.30 |
| | 19 | 24 | 1.45 |
| MK | 19 | 21 | 14.37 |
| | 19 | 22 | 13.80 |
| | 19 | 23 | 13.26 |
| | 19 | 24 | 12.99 |

FIG. 8

| Sample | Ethanol % | Ammonium Sulfate % |
|--------|-----------|--------------------|
| YZ     | 15        | 25                 |
| QDC    | 19        | 24                 |
| MK     | 19        | 21                 |

FIG. 10

| Sample | EtOH % | AS % | Sample to solvent ratios | Conc. of carbohydrates in sample (%) [60 min extraction] |
|---|---|---|---|---|
| YZ | 21 | 20 | 1:40 | 1.81 |
| | | | 1:60 | 1.63 |
| | | | 1:80 | 1.79 |
| | | | 1:100 | 2.05 |
| QDC | 19 | 24 | 1:40 | 1.21 |
| | | | 1:60 | 1.24 |
| | | | 1:80 | 1.21 |
| | | | 1:100 | 1.18 |
| MK | 19 | 21 | 1:40 | 14.25 |
| | | | 1:60 | 14.97 |
| | | | 1:80 | 14.84 |
| | | | 1:100 | 15.61 |

FIG. 11

| Sample | EtOH % | AS % | Extraction temperature (°C) | Conc. of carbohydrates in sample (%) [60 min extraction] |
|---|---|---|---|---|
| YZ | 21 | 20 | 60 | 1.56 |
| | | | 70 | 1.93 |
| | | | 80 | 2.39 |
| | | | 90 | 2.65 |
| | | | 95 | 3.41 |
| QDC | 19 | 24 | 60 | 1.02 |
| | | | 70 | 1.04 |
| | | | 80 | 1.79 |
| | | | 90 | 1.14 |
| MK | 19 | 21 | 60 | 12.44 |
| | | | 70 | 13.99 |
| | | | 80 | 15.43 |
| | | | 90 | 14.14 |

FIG. 13

| Sample | EtOH % | AS % | Extraction time (h) | Conc. of carbohydrates in sample (%) |
|---|---|---|---|---|
| YZ | 21 | 20 | 1 | 3.41 |
| | | | 2 | 5.25 |
| | | | 3 | 5.39 |
| | | | 4 | 5.69 |
| QDC | 19 | 24 | 0.5 | 0.92 |
| | | | 1 | 1.79 |
| | | | 2 | 1.17 |
| | | | 3 | 1.32 |
| MK | 19 | 21 | 0.5 | 12.52 |
| | | | 1 | 15.43 |
| | | | 2 | 12.98 |
| | | | 3 | 14.58 |

FIG. 15

| Sample | Sample to solvent ratio | Extraction temperature (°C) | Extraction time (h) |
|---|---|---|---|
| YZ | 1:40 | 95 | 2 |
| QDC | | 80 | 1 |
| MK | | 80 | 1 |

FIG. 17

| Sample | EtOH % | AS % | Conc. of carbohydrates in sample (%) |
|---|---|---|---|
| YZ | 21 | 20 | 5.15 |
| | | | 5.42 |
| | | | 5.17 |
| | 15 | 25 | 5.65 |
| | | | 6.59 |
| | | | 5.99 |

| Sample | Extraction Method | Extraction Time (h) | Extraction temperature (°C) | Extraction Solvent | Conc. Of carbohydrates in sample (%) | Percentage difference (%) |
|---|---|---|---|---|---|---|
| YZ | Conventional | 2 | 95 | Water | 0.79 | +672.85 |
|  | NAMI | 2 | 95 | DSS (15/25) | 6.07 |  |
| QDC | Conventional | 1 | 80 | Water | 0.80 | +123.20 |
|  | NAMI | 1 | 80 | DSS (19/24) | 1.79 |  |
| MK | Conventional | 1 | 80 | Water | 2.53 | +510.56 |
|  | NAMI | 1 | 80 | DSS (19/21) | 15.43 |  |

FIG. 19

| LC System | Waters Alliance Separations Module e2695 |
|---|---|
| Detector | 2424 ELS Detector |
| Column | Ultrahydrogel Linear Column, 10 µm, 7.8 mm X 300 mm, 1K – 7M |
| Flow | 0.3 ml/min |
| Injection volume | 10 µL |
| Sampler temperature | 20°C |
| Column temperature | 45°C |
| Mobile phase | Milli–Q water |
| ELSD | |
| Gain | 100 |
| Gas pressure | 38 psi |
| Nebulizer | Heating mode, 50% power |
| Drift tube | 100°C |

| Isocratic elution | |
|---|---|
| Time (min) | Water % |
| 0 | 100 |
| 35 | 100 |

FIG. 20

| 10,000 MWCO membrane, 60 rpm ||||||
|---|---|---|---|---|---|---|
| Temperature (°C) | Retentate pressure (psi) | Filtrate flow rate (mL/min) ||| Mean (mL/min) | SD (mL/min) |
| | | 1 | 2 | 3 | | |
| RT | 10 | 3.83 | 4.11 | 4.03 | 3.99 | 0.14 |
| RT | 20 | 8.02 | 7.85 | 7.89 | 7.92 | 0.09 |
| RT | 30 | 12.09 | 11.93 | 11.95 | 11.99 | 0.09 |
| 40 | 10 | 5.37 | 5.42 | 5.93 | 5.57 | 0.31 |
| 40 | 20 | 10.14 | 11.37 | 10.36 | 10.62 | 0.66 |
| 40 | 30 | 15.1 | 14.92 | 14.94 | 14.99 | 0.10 |
| 50 | 10 | 7.06 | 6.79 | 7.00 | 6.95 | 0.14 |
| 50 | 20 | 12.46 | 13.79 | 12.44 | 12.90 | 0.77 |
| 50 | 30 | 17.94 | 17.53 | 17.61 | 17.69 | 0.22 |

FIG. 21

| 5,000 MWCO membrane, 60 rpm | | | | | | |
|---|---|---|---|---|---|---|
| Temperature (°C) | Retentate pressure (psi) | Filtrate flow rate (mL/min) | | | Mean (mL/min) | SD (mL/min) |
| | | 1 | 2 | 3 | | |
| 50 | 30 | 7.85 | 7.77 | 7.54 | 7.72 | 0.16 |
| 50,000 MWCO membrane, 60 rpm | | | | | | |
| Temperature (°C) | Retentate pressure (psi) | Filtrate flow rate (mL/min) | | | Mean (mL/min) | SD (mL/min) |
| | | 1 | 2 | 3 | | |
| 50 | 10 | 31.43 | 31.77 | 31.55 | 31.58 | 0.17 |
| 300,000 MWCO membrane, 60 rpm | | | | | | |
| Temperature (°C) | Retentate pressure (psi) | Filtrate flow rate (mL/min) | | | Mean (mL/min) | SD (mL/min) |
| | | 1 | 2 | 3 | | |
| 50 | 15 | 32.38 | 32.37 | 32.67 | 32.47 | 0.17 |

FIG. 23

| MWCO of membrane (Da) | Temperature (°C) | Retentate pressure (psi) |
|---|---|---|
| 5,000 | 50 | 30 |
| 10,000 | 50 | 30 |
| 50,000 | 50 | 10-30 |
| 300,000 | 50 | 10-30 |

FIG. 24

| Sample | β-glucan | | | |
|---|---|---|---|---|
| | Conc (%) | Mean (%) | SD (%) | Difference(%) |
| YZ-Conv-1 | 0.428 | 0.328 | 0.169 | N/A |
| YZ-Conv-2 | 0.133 | | | |
| YZ-Conv-3 | 0.424 | | | |
| YZ-NAMI-1 | 2.101 | 2.097 | 0.018 | +538.51 |
| YZ-NAMI-2 | 2.078 | | | |
| YZ-NAMI-3 | 2.112 | | | |
| MK-Conv-1 | 0.0337 | 0.018 | 0.013 | N/A |
| MK-Conv-2 | 0.0105 | | | |
| MK-Conv-3 | 0.0105 | | | |
| MK-NAMI-1 | 0.1333 | 0.135 | 0.004 | +638.75 |
| MK-NAMI-2 | 0.1397 | | | |
| MK-NAMI-3 | 0.1312 | | | |

FIG. 27

|  | β-glucan | | | |
|---|---|---|---|---|
| Sample | Conc (%) | Mean (%) | SD (%) | Difference(%) |
| MK-Conventional-1 | 0.0337 | 0.018 | 0.013 | N/A |
| MK-Conventional-2 | 0.0105 | | | |
| MK-Conventional-3 | 0.0105 | | | |
| MK-DSS + HM-1 | 0.0753 | 0.069 | 0.010 | +276.67 |
| MK-DSS + HM-2 | 0.0576 | | | |
| MK-DSS + HM-3 | 0.0731 | | | |
| MK-Water + MW-1 | 0.0536 | 0.071 | 0.016 | +291.98 |
| MK-Water + MW-2 | 0.0794 | | | |
| MK-Water + MW-3 | 0.0814 | | | |
| MK-NAMI-1 | 0.1333 | 0.135 | 0.004 | +638.75 |
| MK-NAMI-2 | 0.1397 | | | |
| MK-NAMI-3 | 0.1312 | | | |

FIG. 29

| | |
|---|---|
| LC System | Waters Alliance Separations Module e2695 |
| Detector | 2998 PDA Detector |
| Column | Ascentis Phenyl column (25cm x 4.6mm, 5um) |
| Flow | 0.3mL/min |
| Injection volume | 5μl |
| Sampler temperature | 15°C |
| Column temperature | 25°C |
| Detection wavelength | UV 200nm |
| Mobile phase | 0.05% $H_3PO_4$ (adjust to pH7 using 4M NaOH) |

Isocratic elution
Elution time: 15 min

FIG. 31

|  | Sodium alginate | | | |
|---|---|---|---|---|
| Sample | Conc (%) | Mean (%) | SD (%) | Difference(%) |
| QDC-Conv-1 | 2.582 | 3.307 | 0.736 | N/A |
| QDC-Conv-2 | 4.053 | | | |
| QDC-Conv-3 | 3.287 | | | |
| QDC-NAMI-1 | 12.877 | 17.983 | 4.422 | +342.97% |
| QDC-NAMI-2 | 20.446 | | | |
| QDC-NAMI-3 | 20.625 | | | |

| Sample | Conc in sample (%) | Mean (%) | SD (%) |
|---|---|---|---|
| YZ-NAMI Peak A-1 | 1.124 | | |
| YZ-NAMI Peak A-2 | 0.694 | 0.962 | 0.234 |
| YZ-NAMI Peak A-3 | 1.067 | | |
| YZ-NAMI Peak B-1 | 1.043 | | |
| YZ-NAMI Peak B-2 | 1.670 | 1.245 | 0.369 |
| YZ-NAMI Peak B-3 | 1.021 | | |

| Sample | Conc in sample (%) | Mean (%) | SD (%) |
|---|---|---|---|
| MK-NAMI Peak A-1 | 0.0365 | 0.028 | 0.010 |
| MK-NAMI Peak A-2 | 0.0307 | | |
| MK-NAMI Peak A-3 | 0.0173 | | |
| MK-NAMI Peak B-1 | 0.0846 | 0.061 | 0.021 |
| MK-NAMI Peak B-2 | 0.0480 | | |
| MK-NAMI Peak B-3 | 0.0500 | | |

| Sample | Conc in sample (%) | Mean (%) | SD (%) |
|---|---|---|---|
| QDC-NAMI Peak A-1 | 8.478 | 9.548 | 1.405 |
| QDC-NAMI Peak A-2 | 11.139 | | |
| QDC-NAMI Peak A-3 | 9.028 | | |
| QDC-NAMI Peak B-1 | 0.446 | 0.347 | 0.134 |
| QDC-NAMI Peak B-2 | 0.399 | | |
| QDC-NAMI Peak B-3 | 0.195 | | |

METHOD FOR EXTRACTING POLYSACCHARIDES

CROSS-REFERENCE TO RELATED APPLICATIONS

The present application claims priority from U.S. Provisional Patent Application No. 63/202,149, filed on May 28, 2021, which is hereby incorporated by reference in its entirety.

TECHNICAL FIELD

The present disclosure relates to a method for extracting one or more polysaccharides from a botanical product, such as a higher plant, an algae, or a fungi. More particularly, the present disclosure relates to a microwave-assisted method of extracting one or more polysaccharides from a botanical product.

BACKGROUND

Polysaccharides are polymeric carbohydrate molecules composed of chains of monosaccharide units. The extraction and isolation of polysaccharides can be a challenge due to their complex structure. The conventional extraction method from natural plants, such as hot water extraction and ethanol precipitation, requires high temperature and long processing time with a low yield of bioactive polysaccharides. Large amounts of solvent are needed for the ethanol precipitation process. Furthermore, water extraction using a single solvent tends to extract only a narrow window of water soluble polysaccharides. The crude extract contains polysaccharides of different sizes and this heterogeneity significantly reduces their bio-functions. Different sizes of polysaccharides often show different levels of bioactivity due to their structural difference. To deal with these shortcomings, exploration of new and efficient methods is a must. New technologies, such as dual solvent extraction, enzymatic digestion, alkaline extraction, ultrasound extraction, and microwave-assisted extractions are emerging, which cater to industrial needs. However, some methods involve multiple steps and complicated processes, which cannot be easily scaled up and applied at an industrial scale.

In addition, the therapeutic value of the polysaccharides can be highly affected by the extraction method conditions, which can affect the polysaccharides' molecular structure, chemical composition, molecular weight, water-solubility, etc.

There is thus a need for improved methods for isolating polysaccharides from botanical products that overcome at least some of the aforementioned challenges.

SUMMARY

In order to overcome at least some of the disadvantages described above, the present disclosure provides a method of extracting polysaccharides from botanical products, such as higher plants and fungi, via a dual solvent system comprising an aqueous solvent and an organic solvent. The extracted polysaccharides can be desalted, purified and concentrated in a single process with the use of membrane filtration/diffusion with a specific MWCO. In the described herein, a small amount of organic solvent can be used, raw materials are evenly heated, extraction yield of polysaccharides is high, and polysaccharides have high water solubility and highly bioactive.

In a first aspect, provided herein is a method for extracting one or more polysaccharides from a sample comprising a botanical product, the method comprising: combining the sample with an extraction solvent in a mass to volume ratio of the sample to the extraction solvent between 1:40 to 1:100, wherein the extraction solvent comprises an alcoholic solvent comprising one or more $C_1$-$C_6$ aliphatic alcohols and an aqueous solvent comprising at least one salt, thereby forming an extraction mixture; irradiating the extraction mixture with microwave radiation resulting in the temperature of the extraction mixture to change to between 50 to 95° C. and the extraction of at least a portion of the one or more polysaccharides from the sample into the extraction solvent and thereby forming an extraction sample; contacting the extraction sample with one or more membranes having one or more molecular weight cut-off (MWCO) values thereby forming a retentate enriched in the one or more polysaccharides; and optionally drying the retentate thereby extracting the one or more polysaccharides.

In certain embodiments, the botanical product is a higher plant, algae, fungi or mixture thereof.

In certain embodiments, the higher plant is *Oryza sativa, Avena sativa, Astragalus membranaceus, Lycium barbarum, Gastrodia elata, Scutellaria baicalensis,* or *Rhodiola rosea*; the algae is *Laminaria, Undaria pinnatifida, Chlorella, Spirulina* or *Euglena*; the fungi is *fungal mycelium, Ganoderma lucidum, Coriolus versicolor, Poria cocos, Boletus edulis,* or *Cordyceps sinensis.*

In certain embodiments, the botanical product is *Coriolus versicolor, Undaria pinnatifida,* or a rice bran.

In certain embodiments, the at least one salt is $R_4N^+X^-$, wherein R for each instance is independently hydrogen or alkyl and X is an anion.

In certain embodiments, the at least salt is selected from the group consisting of ammonium sulfate, ammonium bisulfate, ammonium carbonate, ammonium bicarbonate, ammonium citrate, ammonium chloride, ammonium bromide, ammonium acetate, ammonium formate, sodium dihydrogen phosphate, disodium dihydrogen phosphate, potassium dihydrogen phosphate, and dipotassium hydrogen phosphate.

In certain embodiments, the concentration of the at least one salt in the aqueous solvent is between 10-30% m/v.

In certain embodiments, the alcoholic solvent is methanol, ethanol, isopropanol, or a mixture thereof.

In certain embodiments, the alcoholic solvent and the aqueous solvent are present in a volume ratio of 15:85 to 30:70.

In certain embodiments, the mass to volume ratio of the sample to the extraction solvent is between 1:20 to 1:60.

In certain embodiments, the step of irradiating the extraction mixture with microwave radiation results in the temperature of the extraction mixture to change to between 60 to 95° C.

In certain embodiments, the step of irradiating the extraction mixture with microwave radiation is conducted for between 60 minutes and 120 minutes.

In certain embodiments, the one or more membranes have a MWCO value selected from the group consisting of between 500 to 1,000 Da and 10,000 to 50,000 Da.

In certain embodiments, the method further comprises the step of milling the botanical product thereby forming a milled botanical product and optionally sieving the milled botanical product thereby forming the sample.

In certain embodiments, the step of drying the retentate comprises freeze drying, spray drying, fluid bed drying or direct oven heat drying.

In certain embodiments, the method comprises: combining the sample with an extraction solvent in a mass to volume ratio of the sample to the extraction solvent between 1:20 to 1:40, wherein the extraction solvent comprises ethanol and an aqueous solvent comprising at least one ammonium salt, wherein the concentration of the ammonium salt is 20-30% m/v, thereby forming an extraction mixture; irradiating the extraction mixture with microwave radiation for 60-120 minutes resulting in the temperature of the extraction mixture to change to between 60 to 95° C. and the extraction of at least a portion of the one or more polysaccharides from the sample into the extraction solvent and thereby forming an extraction sample; contacting the extraction sample with one or more membranes having one or more MWCO values thereby forming a retentate enriched in the one or more polysaccharides; and optionally drying the retentate thereby extracting the one or more polysaccharides.

In certain embodiments, the one or more membranes have a MWCO value selected from the group consisting of between 500 to 1,000 Da and 10,000 to 50,000 Da.

In certain embodiments, the one or more polysaccharides are selected from the group consisting of β-glucan and sodium alginate.

In certain embodiments, the botanical product is *Coriolus versicolor*, *Undaria pinnatifida*, or a rice bran.

In certain embodiments, the method comprises: combining the sample with an extraction solvent in a mass to volume ratio of the sample to the extraction solvent between 1:40 to 1:60, wherein the extraction solvent comprises ethanol and an aqueous solvent comprising at least one ammonium sulfate, wherein the ethanol and aqueous solvent are present in a volume ratio of 19:81 to 21:79 and concentration of the ammonium salt is 20-25% m/v, thereby forming an extraction mixture; irradiating the extraction mixture with microwave radiation for 60-120 minutes resulting in the temperature of the extraction mixture to change to between 80 to 95° C. and the extraction of at least a portion of the one or more polysaccharides from the sample into the extraction solvent and thereby forming an extraction sample; contacting the extraction sample with one or more membranes, wherein the one or more membranes have a MWCO value selected from the group consisting of between 500 to 1,000 Da and 10,000 to 50,000 Da; thereby forming a retentate enriched in the one or more polysaccharides; and optionally drying the retentate thereby extracting the one or more polysaccharides, wherein the botanical product is *Coriolus versicolor*, *Undaria pinnatifida*, or a rice bran and the one or more polysaccharides are selected from the group consisting of β-glucan and sodium alginate.

In certain embodiments, the method comprises:
(1) putting milled higher plants, algae, or fungi into a microwave reaction chamber, adding a dual solvent system in a herb-to-solvent ratio of 1:20 to 1:40, subjecting a mixture of the milled higher plants, algae, or fungi and the dual solvent system for 60 to 120 minutes to a microwave heating at a controlled temperature of 80 to 95° C.; and
(2) filtering the mixture obtained in the step a) with a filter or sieve, passing the filtered mixture through the membrane of specific MWCO to remove the molecules with high molecular weight, and passing the filtrate through another membrane of 500 to 1000 Da to remove small molecules, salts and solvents; and
(3) drying the retentate from the step b) to obtain the extract containing polysaccharides.

The method disclosed herein provides a convenient yet effective means to extract bioactive polysaccharides from botanical products. The method can shorten the processing time of the polysaccharides extraction from at least one day to a few hours.

BRIEF DESCRIPTION OF THE DRAWINGS

The above and other objects and features of the present disclosure will become apparent from the following description of the disclosure, when taken in conjunction with the accompanying drawings.

FIG. 6 depicts tabulated results of experiments evaluating the effect of different volume/volume percentages of ethanol (ETOH) in water on the extraction of polysaccharides from *Coriolus versicolor* (YZ), *Undaria pinnatifida* (QDC), and rice bran (MK).

FIG. 8 depicts tabulated results of experiments evaluating the effect of different volume/volume percentages of ethanol (ETOH) in water containing different mass/volume percentages of ammonium sulfate (AS) on the extraction of polysaccharides from *Coriolus versicolor* (YZ), *Undaria pinnatifida* (QDC), and rice bran (MK).

FIG. 10 depicts a table showing the optimized dual solvent extraction composition in terms of volume/volume percentage of ethanol in water containing mass/volume percentage of ammonium sulfate (AS).

FIG. 11 depicts tabulated results of experiments evaluating the effect of varying the ratio of the mass of *Coriolus versicolor* (YZ), *Undaria pinnatifida* (QDC), and rice bran (MK) to volume of the optimal dual solvent system (DSS) shown in FIG. 10 on the extraction of polysaccharides.

FIG. 13 depicts tabulated results of experiments evaluating the effect of varying temperature on the extraction of polysaccharides from *Coriolus versicolor* (YZ), *Undaria pinnatifida* (QDC), and rice bran (MK) using the solvent system shown in FIG. 10 and using a 1:40 (m/v) sample to solvent ratio.

FIG. 15 depicts tabulated results of experiments evaluating the effect of varying the time on the extraction of polysaccharides from *Coriolus versicolor* (YZ), *Undaria pinnatifida* (QDC), and rice bran (MK) using the solvent system shown in FIG. 10 and using a 1:40 (m/v) sample to solvent ratio and an extraction temperature of 80° C. for *Undaria pinnatifida* (QDC) and rice bran (MK); and 95° C. for *Coriolus versicolor* (YZ).

FIG. 17 depicts a table showing the optimized dual solvent extraction composition in terms of sample to solvent (mlv ratio), solvent extraction temperature, and solvent extraction time and using the optimal dual solvent system (DSS) shown in FIG. 10.

FIG. 19 depicts a table showing the results of certain embodiments of the methods described herein on the extraction of polysaccharides from *Coriolus versicolor* (YZ), *Undaria pinnatifida* (QDC), and rice bran (MK) and conventional extraction methods.

FIG. 20 depicts an exemplary gel permeation chromatography/evaporative light-scattering detector (GPC/ELSD) method for determination of molecular weights of polysaccharides in sample extracts.

FIG. 21 depicts a table showing experiments used to optimize ultrafiltration retentate pressure and temperature.

FIG. 23 depicts a table showing experiments used to optimize ultrafiltration retentate pressure and temperature using membranes with 5,000 amu, 50,000 amu, and 300,000 amu MCWO values.

FIG. 24 depicts a table showing experiments optimized ultrafiltration retentate pressure and temperature using membranes with 5,000 amu, 50,000 amu, and 300,000 amu MCWO values.

FIG. 27 depicts a table showing the results of extracting β-glucan from *Coriolus versicolor* (YZ) and rice bran (MK) using conditions described in Examples 1 and 2 for YZ and Examples 5 and 6 for MK and conventional extraction methods using conditions described in Comparative Examples 1 and 3.

FIG. 29 depicts a table showing the results of extracting β-glucan from rice bran (MK) using conditions described in Examples 5 and 6 for MK and conventional extraction methods using conditions described in Comparative Examples 4 and 5.

FIG. 31 depicts an exemplary GPC/ELSD method for determination of molecular weights of sodium alginate in sample extracts.

DETAILED DESCRIPTION

Definitions

Figure 1:
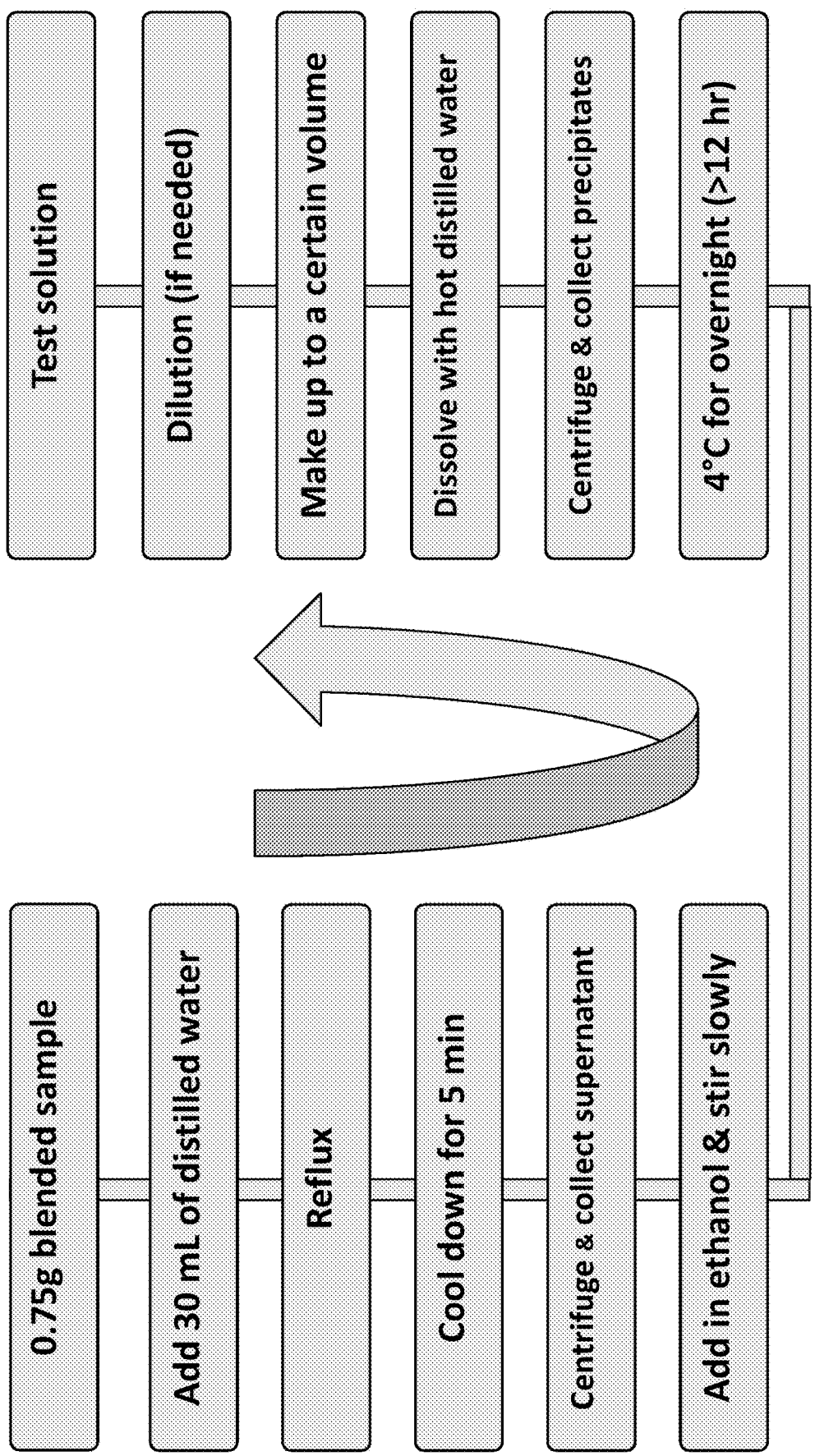
FIG. 1 depicts an exemplary flow chart for extraction of polysaccharides from a botanical product using conventional extraction methods.

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

It should be understood that the order of steps or order for performing certain actions is immaterial so long as the present teachings remain operable. Moreover, two or more steps or actions may be conducted simultaneously.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10%, ±7%, ±5%, ±3%, ±1%, or ±0% variation from the nominal value unless otherwise indicated or inferred.

The present disclosure provides a method for extracting one or more polysaccharides from a sample comprising a botanical product, the method comprising: combining the sample with an extraction solvent in a mass to volume ratio of the sample to the extraction solvent between 1:40 to 1:100, wherein the extraction solvent comprises an alcoholic solvent comprising one or more $C_1$-$C_6$ aliphatic alcohols and an aqueous solvent comprising at least one salt, thereby forming an extraction mixture; irradiating the extraction mixture with microwave radiation resulting in the temperature of the extraction mixture to change to between 50 to 95° C. and the extraction of at least a portion of the one or more polysaccharides from the sample into the extraction solvent and thereby forming an extraction sample; contacting the extraction sample with one or more membranes of one or more MWCO values thereby forming a retentate enriched in the one or more polysaccharides; and optionally drying the retentate thereby extracting the one or more polysaccharides.

The botanical product can include any constituent of a plant, higher plant, tree, algae, fungi, or combination thereof that contains or is suspected of containing one or more polysaccharides. The botanical product can include, but is not limited to, stems, leaves, bark, fruit, skin of fruit, vegetables, flowers, seeds, roots, rhizomes, legumes or any organic constituent of a plant or tree.

The higher plant can be *Oryza sativa, Avena sativa, Astragalus membranaceus, Lycium barbarum, Gastrodia elata, Scutellaria baicalensis*, or *Rhodiola rosea*. The algae can be *Laminaria, Undaria pinnatifida, Chlorella, Spirulina* or *Euglena*. The fungi can be *fungal mycelium, Ganoderma lucidum, Coriolus versicolor, Poria cocos, Boletus edulis*, or *Cordyceps sinensis*.

In certain embodiments, the botanical product comprises one or more constituents of a grass species. In certain embodiments, the botanical product comprises one or more constituents of a cereal grain. Exemplary cereal grains include, but are not limited to, *Oryza sativa, Oryza glaberrima, Avena sativa*, and *Triticum aestivum, Zea mays*, various members of the Poaceae family, and the like. In certain embodiments, the botanical product comprises the bran of a grass species selected from rice, Asian rice, and African rice. In certain embodiments, the botanical product is rice grain, rice endosperm, rice germ, rice bran, and mixtures thereof.

In certain embodiments, the botanical product is rice bran (e.g., from *Oryza sativa* or *Oryza glaberrima*), *Coriolus versicolor*, or *Undaria pinnatifida*.

The botanical product can be used directly in the methods described herein or can optionally pretreated by, e.g., mechanical pretreatment, such as mulching, shredding, chopping, milling, grinding, and/or sieving; and/or chemical pretreatment, such as acidic or basic extraction to remove impurities.

In certain embodiments, the botanical product is blended or milled and optionally sieved. The botanical product can be milled to generate powdered botanical product having an average particle size of 100 to 2,000 µm, 100 to 1,500 µm, 100 to 1,000 µm, or 100 to 500 µm. In certain embodiments, the powdered botanical product has an average particle size of about 500 µm or less. The pore size of the sieve can range in pore size from 250 to 2,000 µm, 250 to 1,000 µm, or 250 to 750 µm. In certain embodiments, the pore size of the sieve has a pore size of about 500 µm.

The extraction solvent can comprise an alcoholic solvent comprising one or more $C_1$-$C_6$ aliphatic alcohols and an aqueous solvent comprising at least one salt. In certain embodiments, the alcoholic solvent comprises one or more $C_1$-$C_5$, $C_1$-$C_4$, $C_1$-$C_3$, or $C_2$-$C_3$, aliphatic alcohols. Exemplary $C_1$-$C_6$ aliphatic alcohols include, but are not limited to, methanol, ethanol, 1-proponol, isoproponol, n-butanol, isobutanol, sec-butanol, tert-butyl alcohol, 1-pentanol, isoamyl alcohol, 2-methyl-1-butanol, neopentyl alcohol, 2-pentanol, 3-methyl butanol, 3-pentanol, tert-amyl alcohol, 1-hexanol, 2-hexanol, 3-hexanol, 2-methyl-1-pentanol, 3-methyl-1-pentanol, 4-methyl-1-pentanol, 2-methyl-2-pentanol, 3-methyl-2-pentanol, 4-methyl-2-pentanol, 2-methyl-3-pentanol, 3-methyl-3-pentanol, 2,2-dimethyl-1-butanol, 2,3-dimethyl-1-butanol, and 3,3-dimethyl-1-butanol. In certain embodiments, the alcoholic solvent comprises one or more of methanol, ethanol, 1-proponol, and isopropanol. In certain embodiments, the alcoholic solvent is ethanol.

Figure 7:
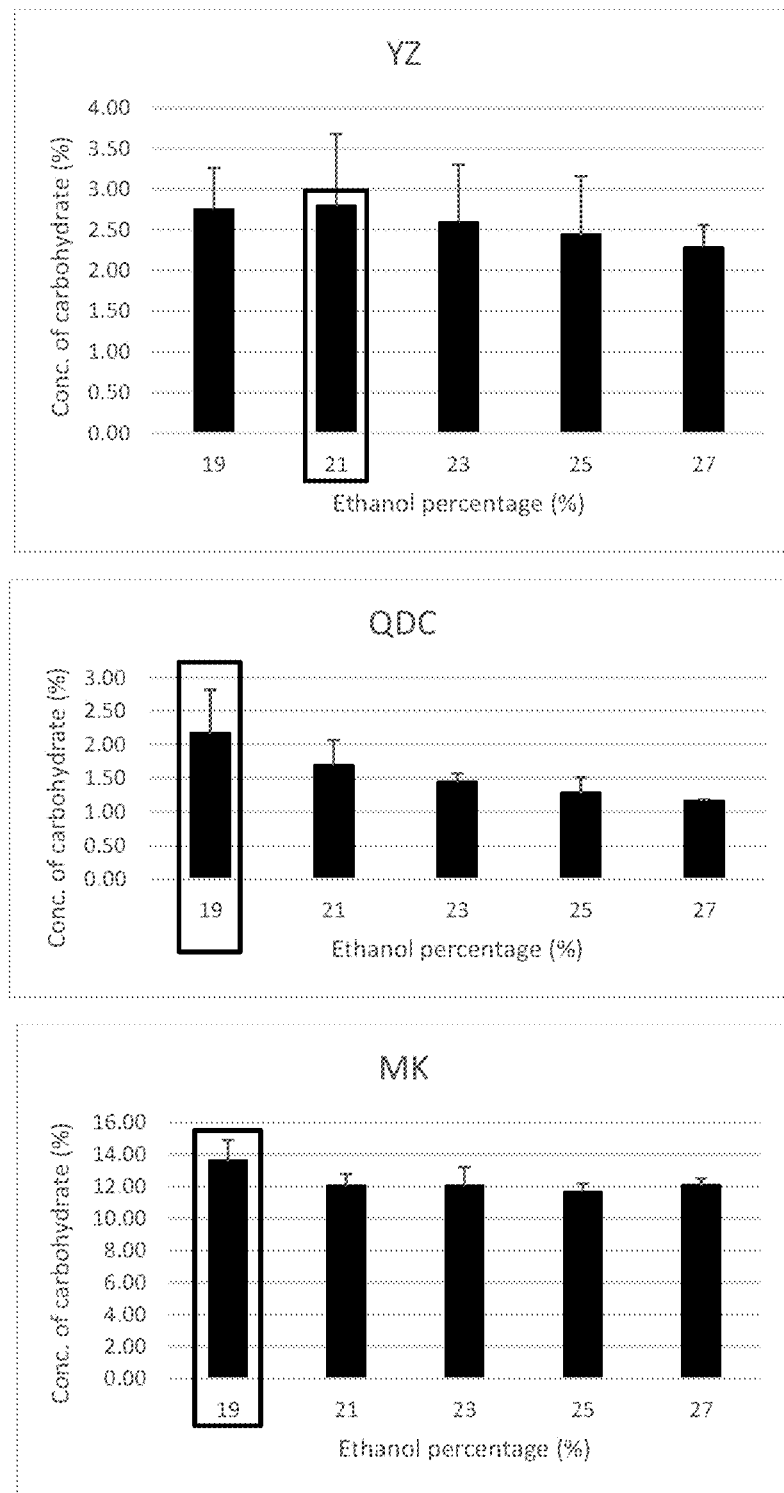
FIG. 7 depicts graphed results of experiments evaluating the effect of different volume/volume percentages of ethanol in water on the extraction of polysaccharides from *Coriolus versicolor* (YZ), *Undaria pinnatifida* (QDC), and rice bran (MK).

The alcoholic solvent and the aqueous solvent can be present in any volume ratio between 0.1:99.9 to 99.9:0.1, but is generally between 10:90 to 50:50, 10:90 to 40:60, 10:90 to 30:70, 15:85 to 30:70, 15:85 to 25:75, 19:81 to 25:75, 19:81 to 23:77, or 19:81 to 21:79. As shown in FIGS. 6 and 7, the amount of polysaccharides recovered was highest when the alcoholic solvent and the aqueous solvent were present in any volume ratio between about 19:81 to 21:79.

The aqueous solvent can comprise at least one salt. The salt is not particularly limited and can be any salt known to those skilled in the art. Exemplary salts include Group I, Group II, or ammonium or alkylammonium salts of halide, sulfate, phosphate, hydrogen phosphate, dihydrogen phosphate, carbonate, bicarbonate, citrate, tartrate, lactate, acetate, formate, fumarate, malate, maleate, malonate, succinate, and the like.

In instances in which the salt is an ammonium or alkylammonium salts, it can be represented by the formula: $R_4N^+X^-$, wherein R for each instance is independently hydrogen or alkyl and X is an anion, such as halide, sulfate, phosphate, hydrogen phosphate, dihydrogen phosphate, carbonate, bicarbonate, citrate, tartrate, lactate, acetate, formate, fumarate, malate, maleate, malonate, succinate, and the like. Each alkyl can independently be $C_1$-$C_6$ alkyl, $C_1$-$C_5$ alkyl, $C_1$-$C_4$ alkyl, $C_1$-$C_3$ alkyl, or $C_1$-$C_2$ alkyl. In certain embodiments, the at least one salt is ammonium sulfate.

Figure 9:
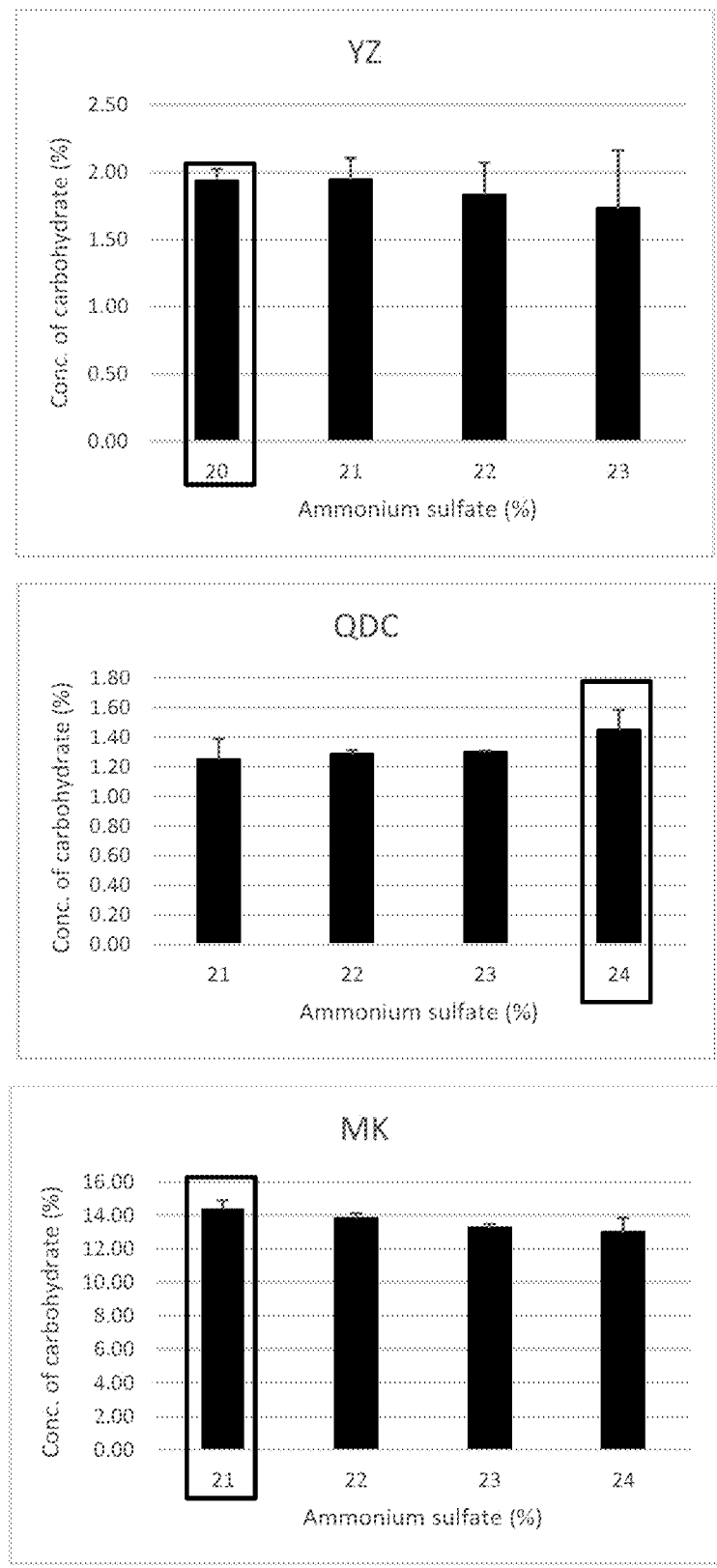
FIG. 9 depicts graphed results of experiments evaluating the effect of different volume/volume percentages of ethanol (ETOH) in water containing different mass/volume percentages of ammonium sulfate (AS) on the extraction of polysaccharides from *Coriolus versicolor* (YZ), *Undaria pinnatifida* (QDC), and rice bran (MK).

The concentration of the at least one salt in the aqueous solvent can be between 5-60% m/v, 10-60% m/v, 10-50% m/v, 10-40% m/v, 10-30% m/v, 20-30% m/v, 20-29% m/v, 20-28% m/v, 20-27% m/v, 20-26% m/v, 20-25% m/v, 20-24% m/v, or 21-24% m/v. As shown in FIGS. 8-10, the amount of polysaccharides recovered was highest when the concentration of the at least one salt (ammonium sulfate) in the aqueous solvent is about 21% m/v or about 24% m/v.

Figure 12:
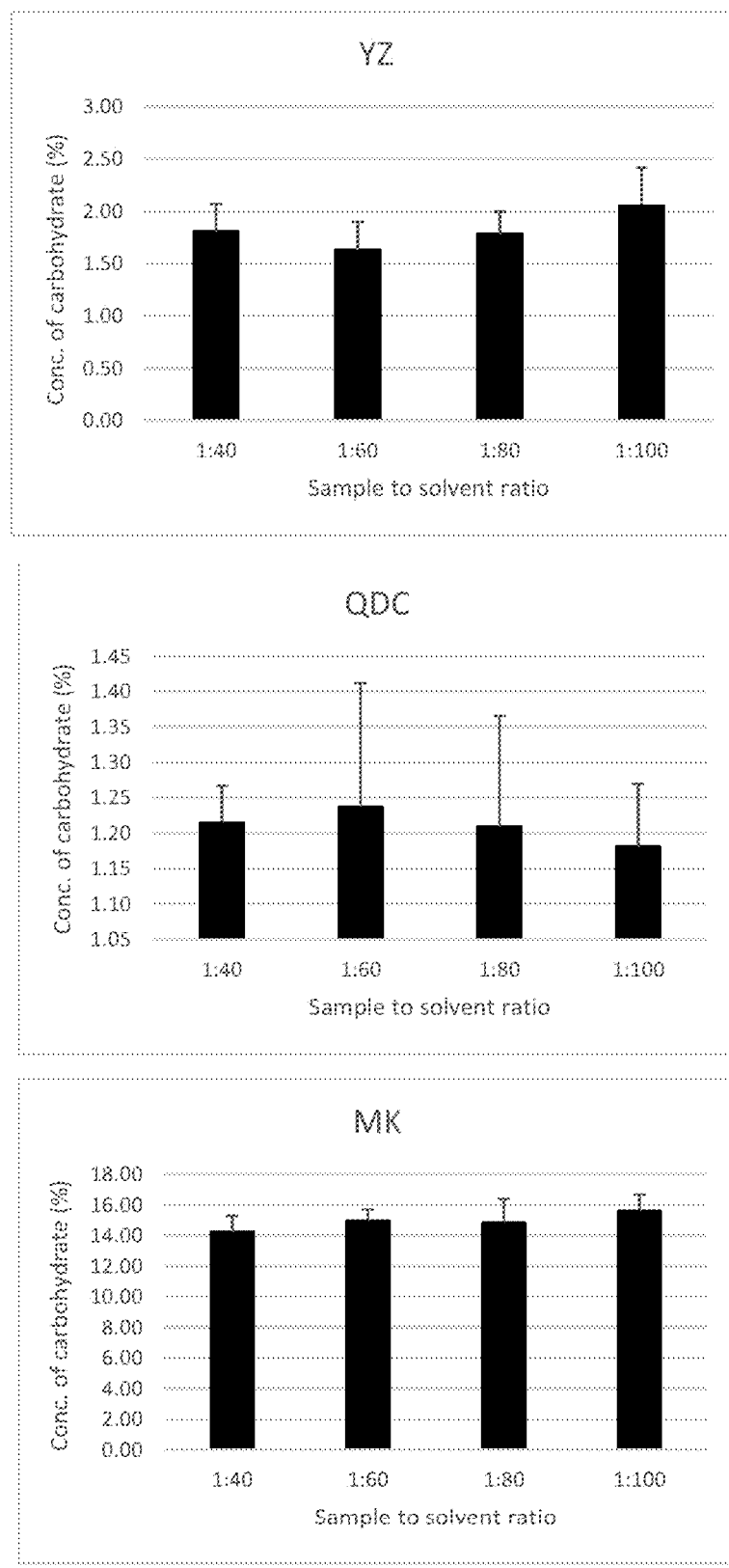
FIG. 12 depicts graphed results of experiments evaluating the effect of varying the ratio of the mass of *Coriolus versicolor* (YZ), *Undaria pinnatifida* (QDC), and rice bran (MK) to volume of the optimal dual solvent system (DSS) shown in FIG. 10 on the extraction of polysaccharides.

The mass to volume ratio of the sample to the extraction solvent can be between 1:100 to 1:1, 1:100 to 2:3, 1:100 to 3:7, 1:100 to 1:4, 1:100 to 1:9, 1:100 to 1:40, 1:100 to 1:60, 1:100 to 1:80, 1:80 to 1:40, 1:80 to 1:60, or 1:60 to 1:40. As shown in FIGS. 11 and 12, the amount of polysaccharides recovered was highest when the mass to volume ratio of the sample to the extraction solvent was about 1:40.

The microwave used to irradiate the extraction mixture with microwave radiation can operate in continuous microwave mode, pulse microwave mode, or a combination of continuous microwave and pulse microwave modes.

The overall microwave power or dose to be applied may be selected and varied depending on the type of botanical product being extracted and the scale of the microwave-assisted extraction step. Any wavelength within the microwave spectrum which is absorbed to some extent by a component of the sample, can be used. Typical power for the microwave can be about 200 to about 6,500 watts or about 1,900 watts to about 6,500 watts or higher. The typical frequency of the microwave can be within about 2,000 to about 30,000 MHz.

Figure 14:
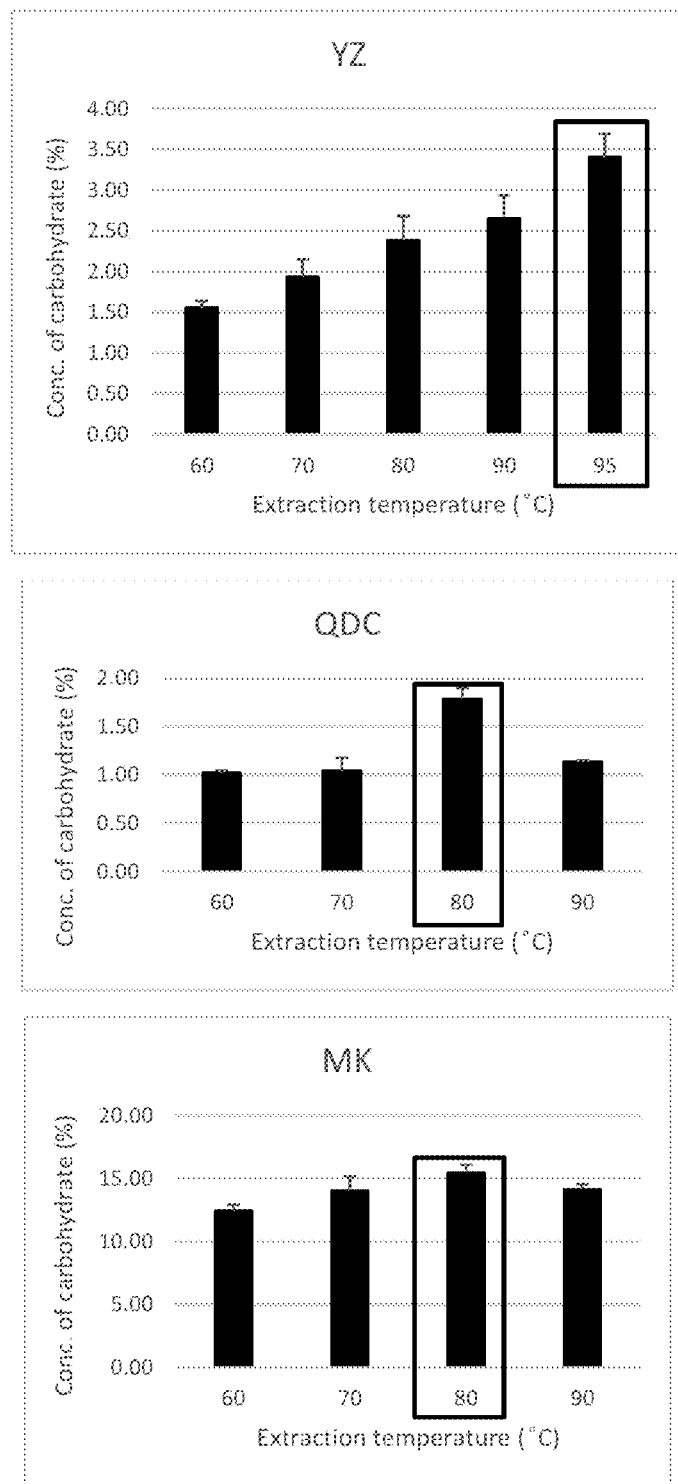
FIG. 14 depicts graphed results of experiments evaluating the effect of varying the temperature on the extraction of polysaccharides from *Coriolus versicolor* (YZ), *Undaria pinnatifida* (QDC), and rice bran (MK) using the solvent system shown in FIG. 10 and using a 1:40 (m/v) sample to solvent ratio.

The step of irradiating the extraction mixture with microwave radiation cause the temperature of the reaction mixture to adjust (typically increase) to 40-120° C., 40-110° C., 40-100° C., 50-100° C., 60-100° C., 60-95° C., 70-95° C., 80-95° C., 90-100° C., or 75-85° C. As shown in FIGS. 13 and 14, the amount of polysaccharides recovered was highest when the, the step of irradiating the extraction mixture with microwave radiation caused the temperature of the reaction mixture to adjust (typically increase) to about 80° C. or about 95° C.

Figure 16:
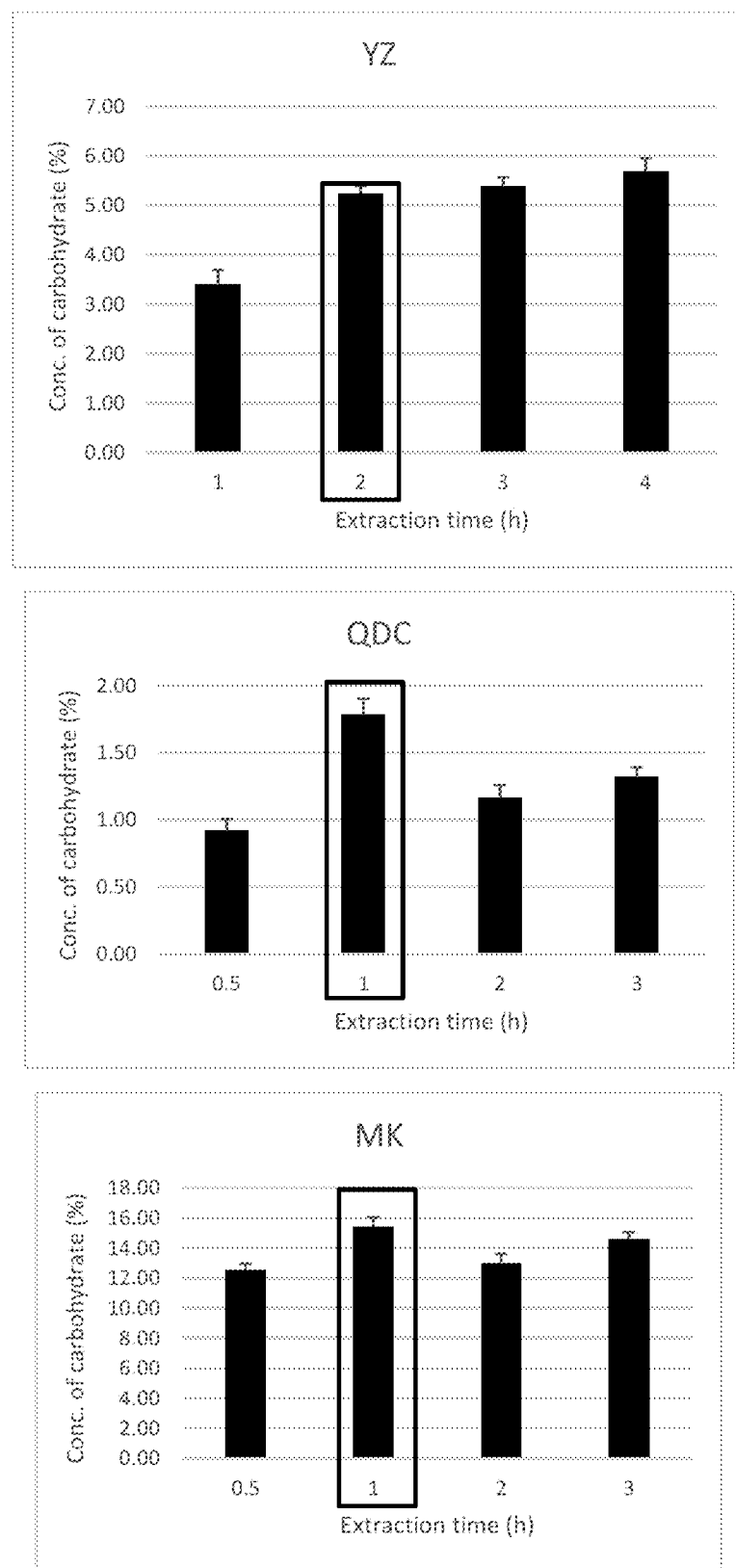
FIG. 16 depicts graphed results of experiments evaluating the effect of varying the time on the extraction of polysaccharides from *Coriolus versicolor* (YZ), *Undaria pinnatifida* (QDC), and rice bran (MK) using the solvent system shown in FIG. 10 and using a 1:40 (m/v) sample to solvent ratio and an extraction temperature of 80° C. for *Undaria pinnatifida* (QDC) and rice bran (MK); and 95° C. for *Coriolus versicolor* (YZ).
Figure 18:
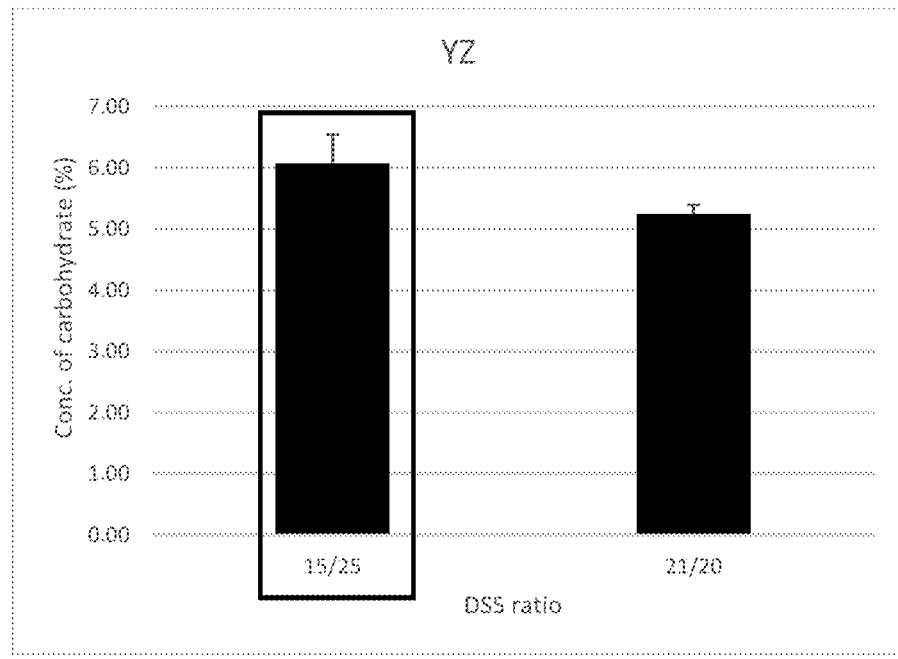
FIG. 18 depicts graphed and tabulated results of extraction of *Coriolus versicolor* (YZ) using 15% ethanol in 85% water containing 25% m/v ammonium sulfate; and 21% ethanol in 89% water containing 20% m/v ammonium sulfate on the mass polysaccharides extracted.
Figure 22:
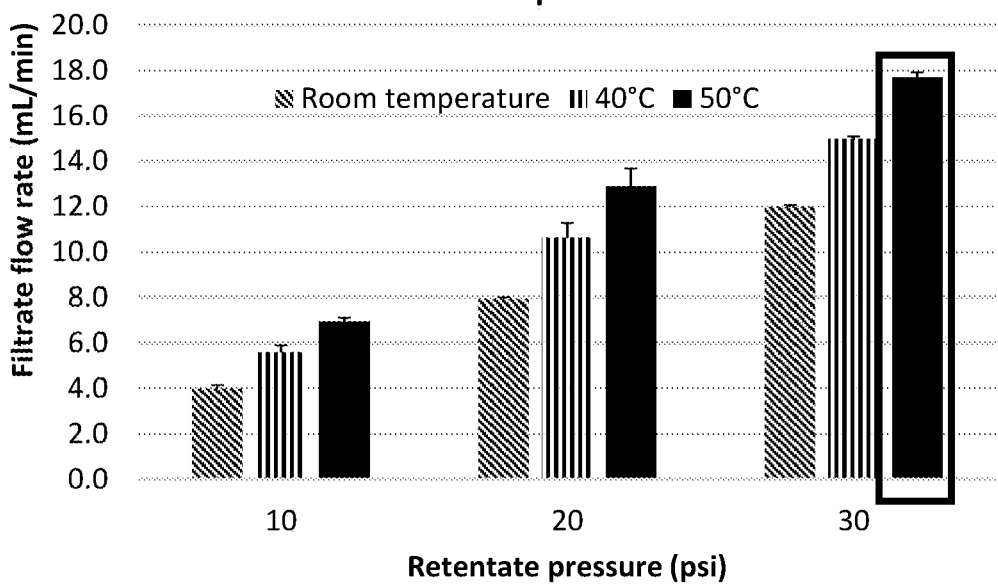
FIG. 22 depicts a graph showing experiments used to optimize ultrafiltration retentate pressure and temperature.
Figure 25:
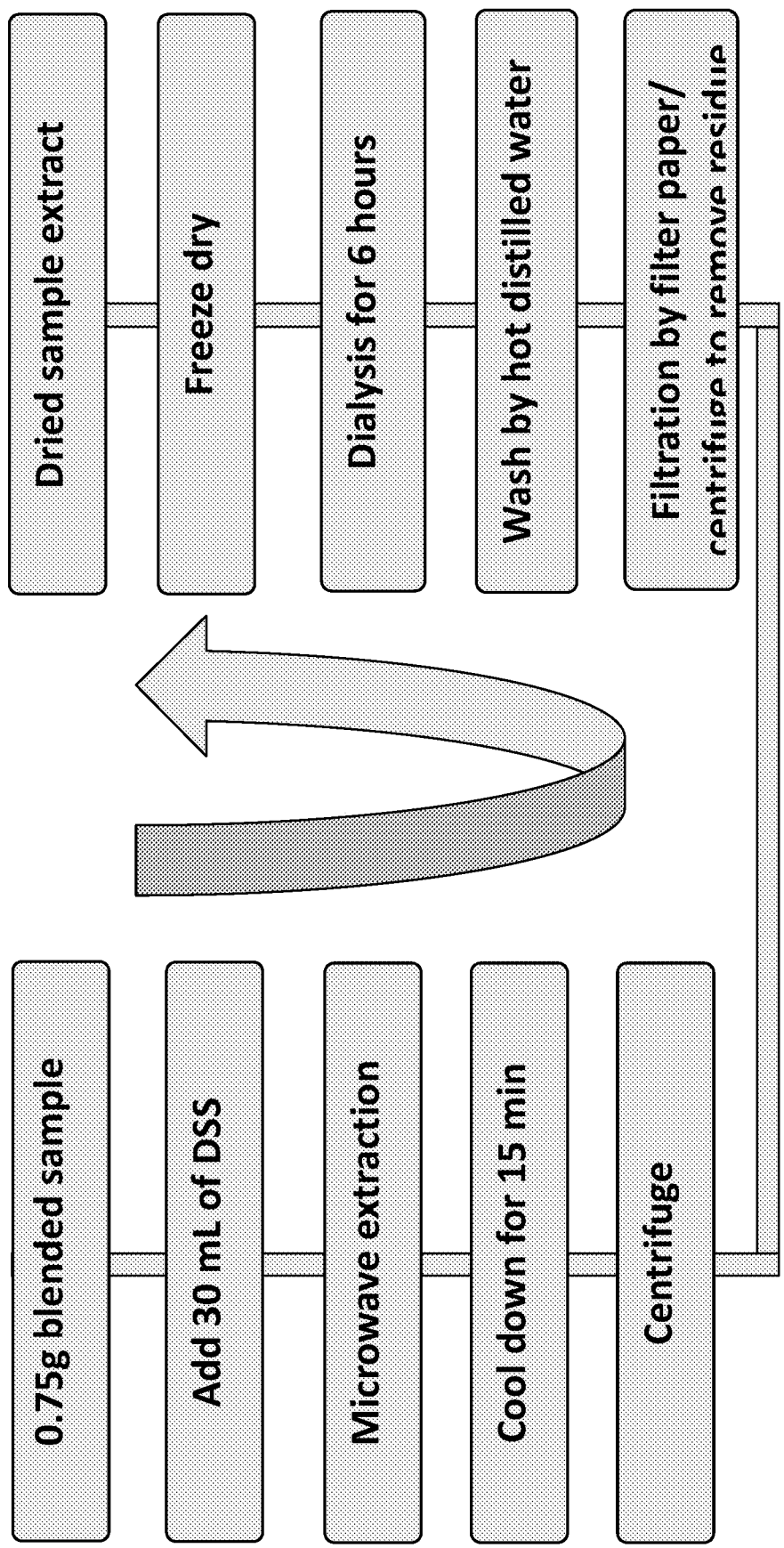
FIG. 25 depicts an exemplary flow chart for the extraction of β-glucan and/or sodium alginate from a botanical product in accordance with certain embodiments described herein.
Figure 26:
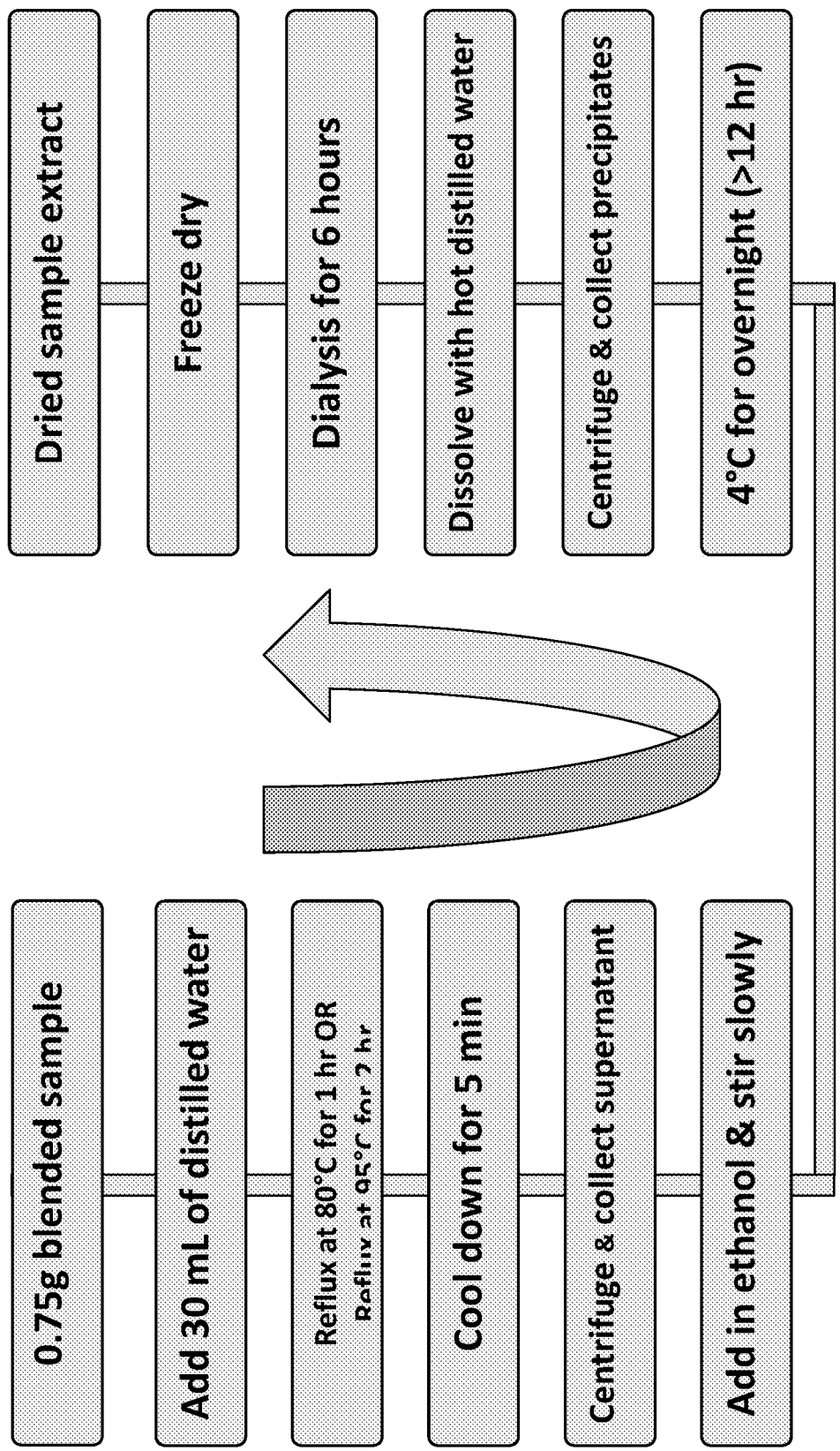
FIG. 26 depicts an exemplary flow chart for extraction of β-glucan and/or sodium alginate from a botanical product using conventional extraction methods.
Figure 28:
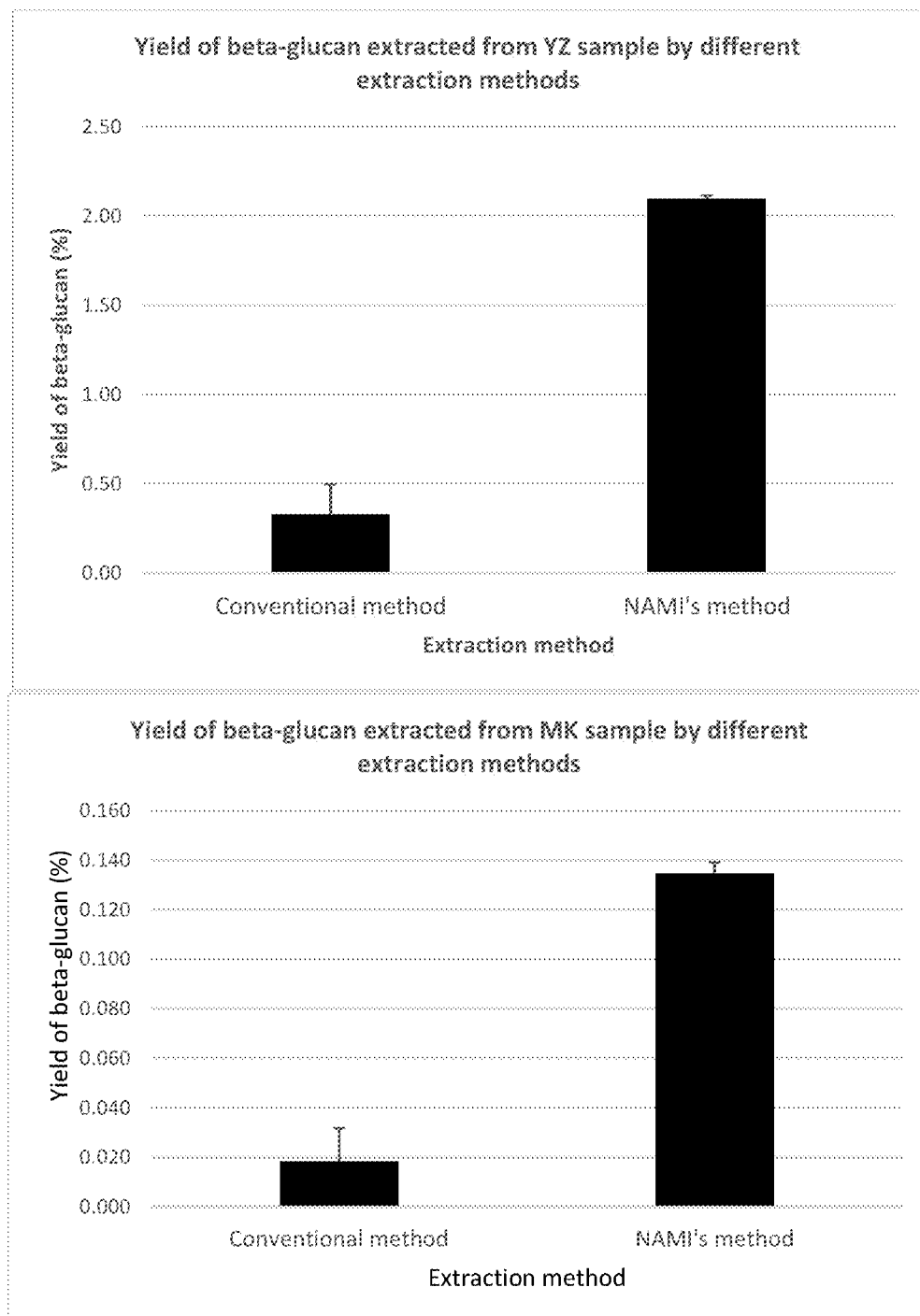
FIG. 28 depicts graphs showing the results of extracting β-glucan from *Coriolus versicolor* (YZ) and rice bran (MK) using certain embodiments of the methods described herein and conventional extraction methods.
Figure 30:
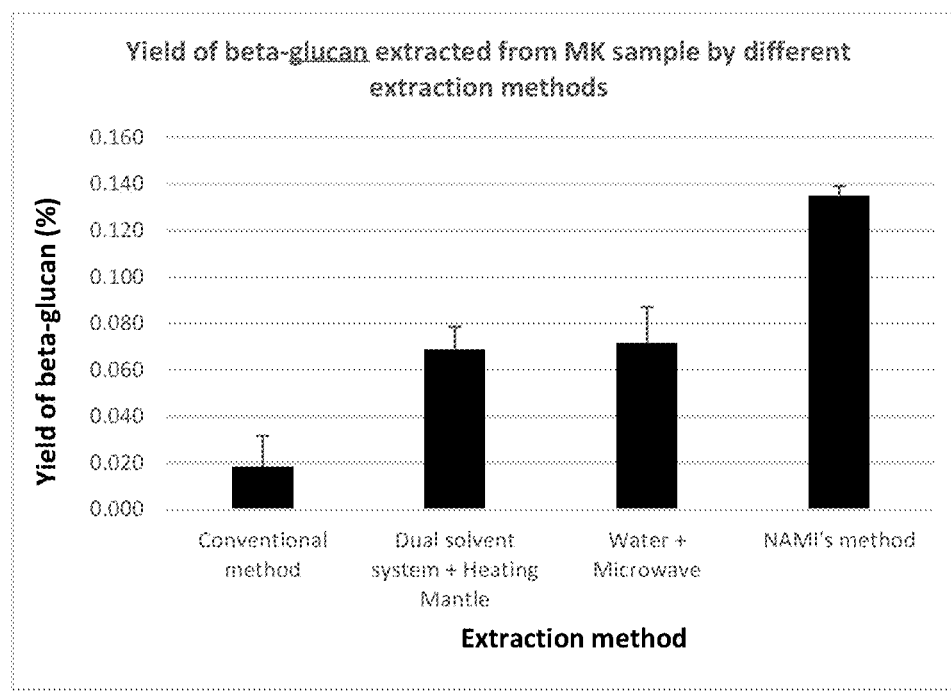
FIG. 30 depicts a graph showing the results of extracting β-glucan from rice bran (MK) using certain embodiments of the methods described herein and conventional extraction methods.
Figures 32, 33:
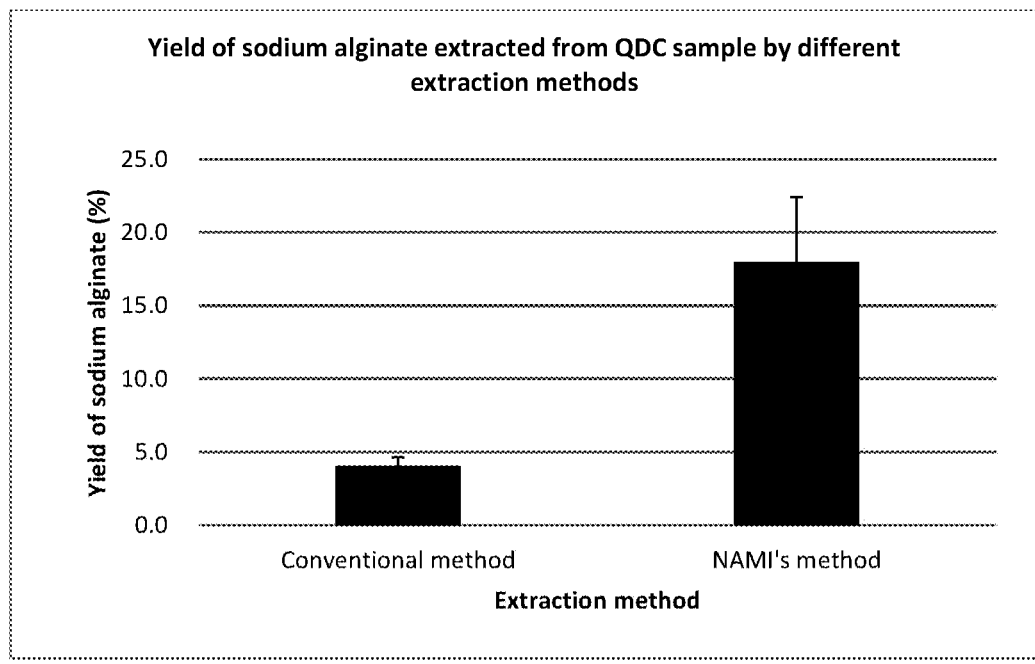
FIG. 32 depicts a table showing the results of extracting sodium alginate from *Undaria pinnatifida* (QDC) using conditions described in Examples 3 and 4 and conventional extraction methods using conditions described in Comparative Example 2.
FIG. 33 depicts a graph showing the results of extracting sodium alginate from *Undaria pinnatifida* (QDC) using certain embodiments of the methods described herein and conventional extraction methods.
Figure 34:
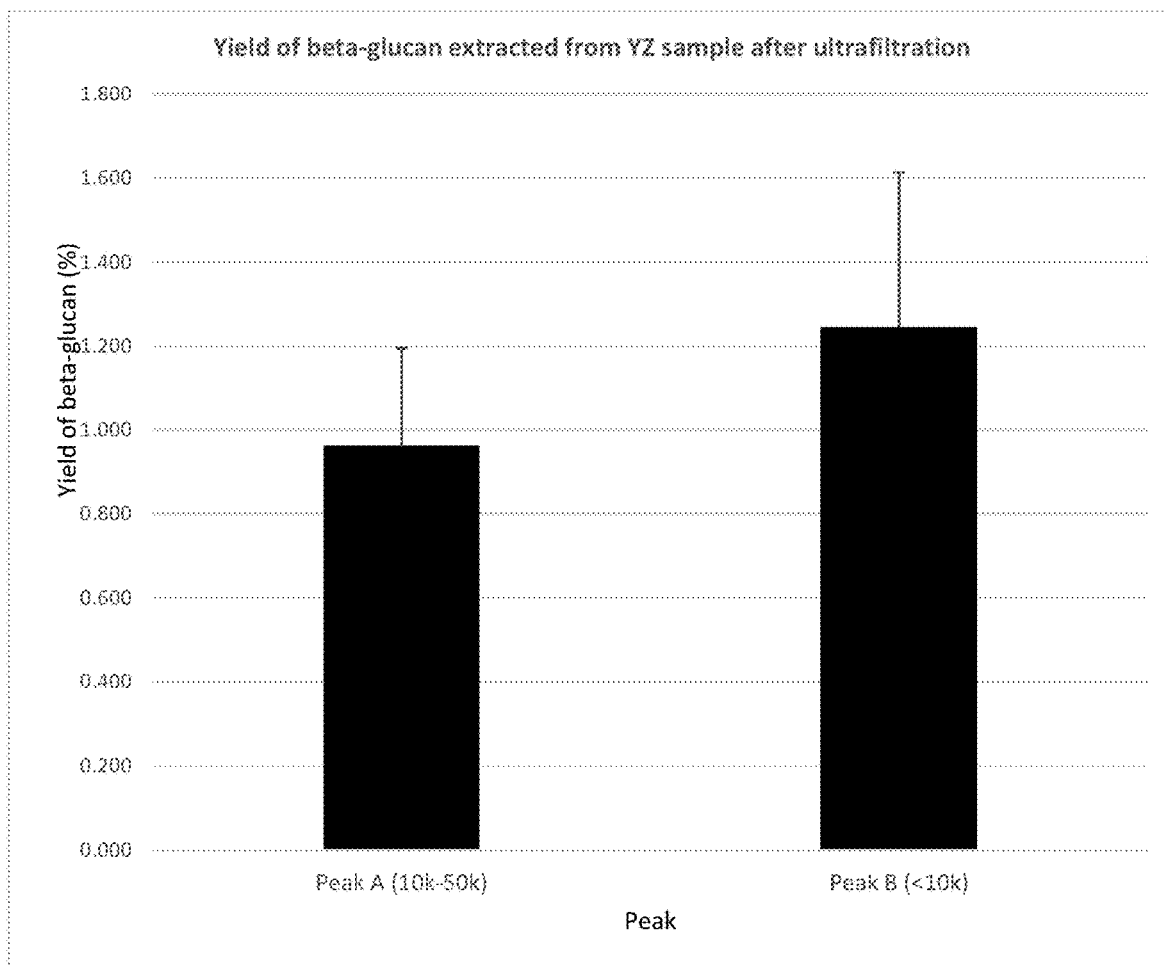
FIG. 34 depicts a table and graph showing the results of extracting β-glucan from *Coriolus versicolor* (YZ) using optimized dual-solvent system and ultrafiltration in accordance with certain embodiments of the methods described herein; and a chromatograph showing the MWCO value membrane utilized.
Figure 34:
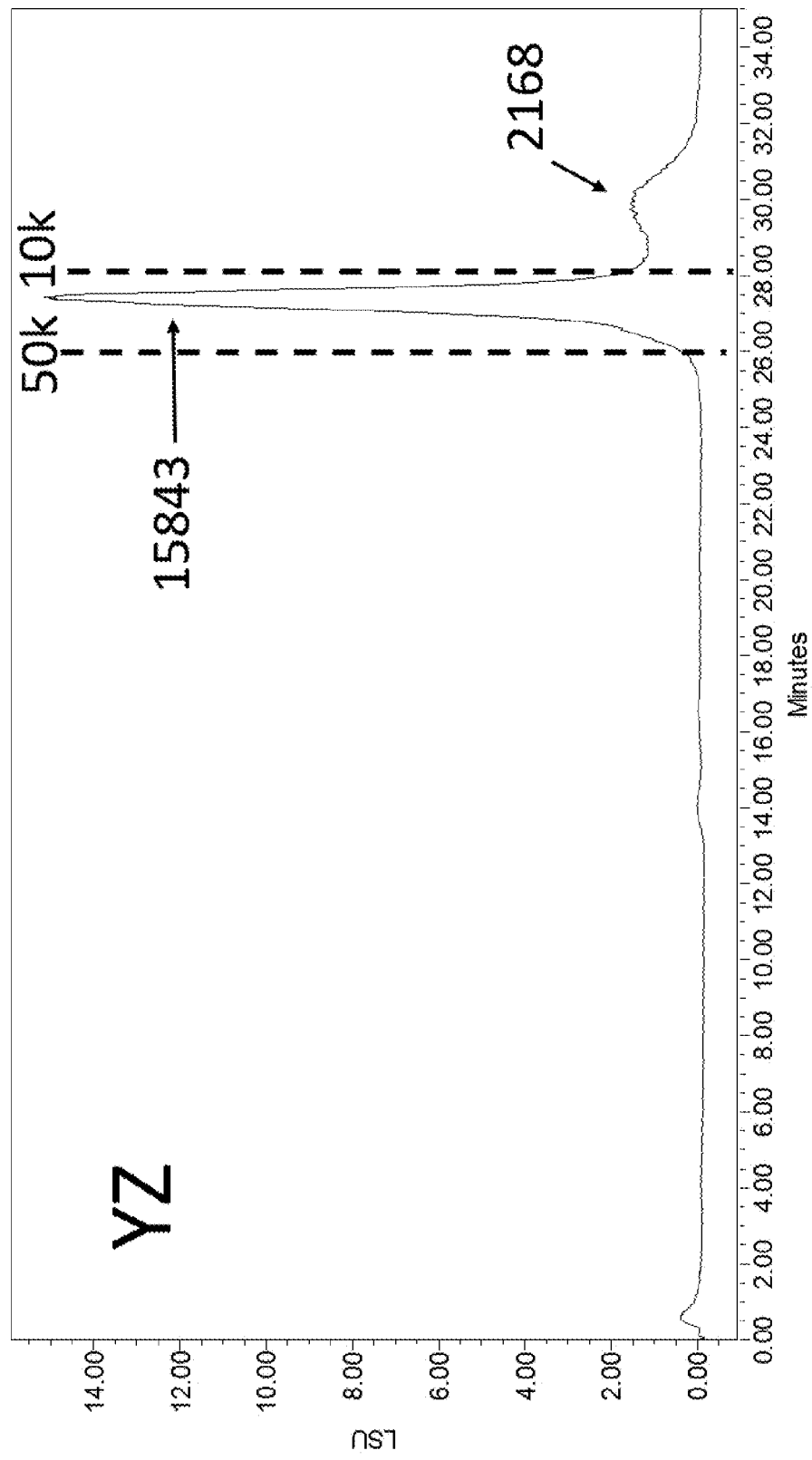
Figure 35:
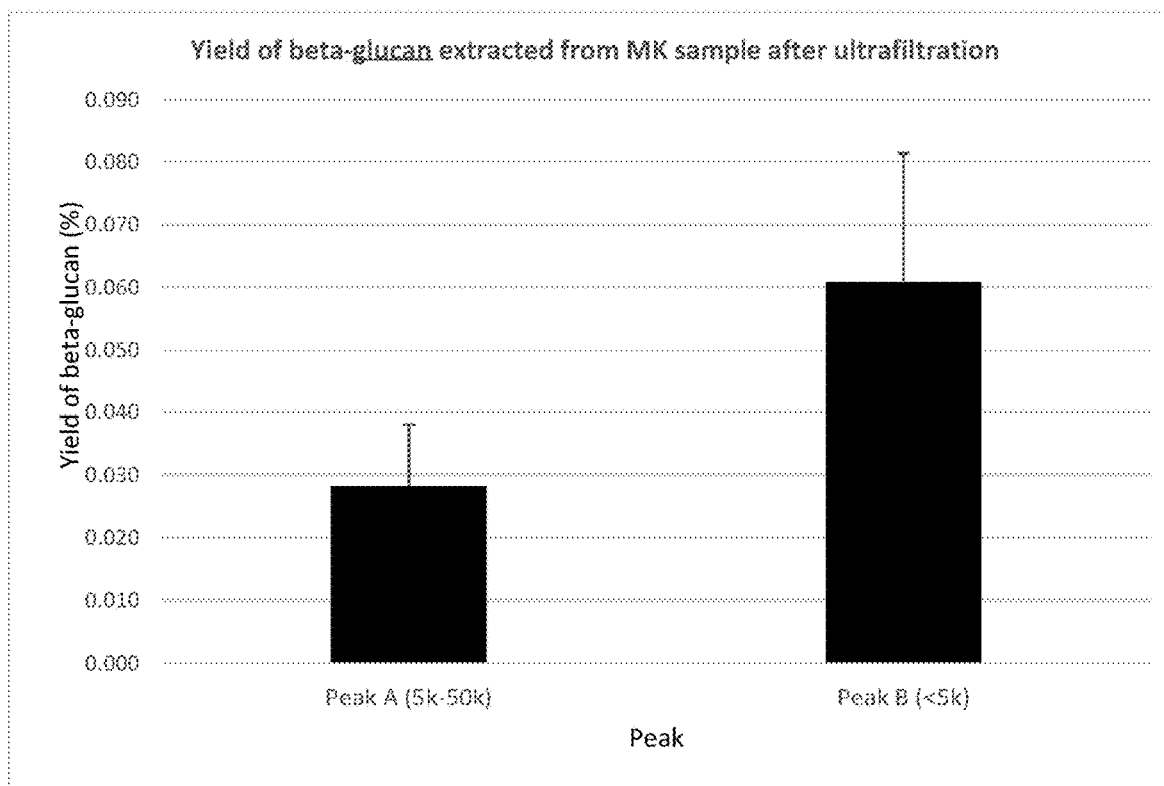
FIG. 35 depicts a table and graph showing the results of extracting β-glucan from rice bran (MK) using optimized dual-solvent system and ultrafiltration in accordance with certain embodiments of the methods described herein; and a chromatograph showing the MWCO utilized.
Figure 35:
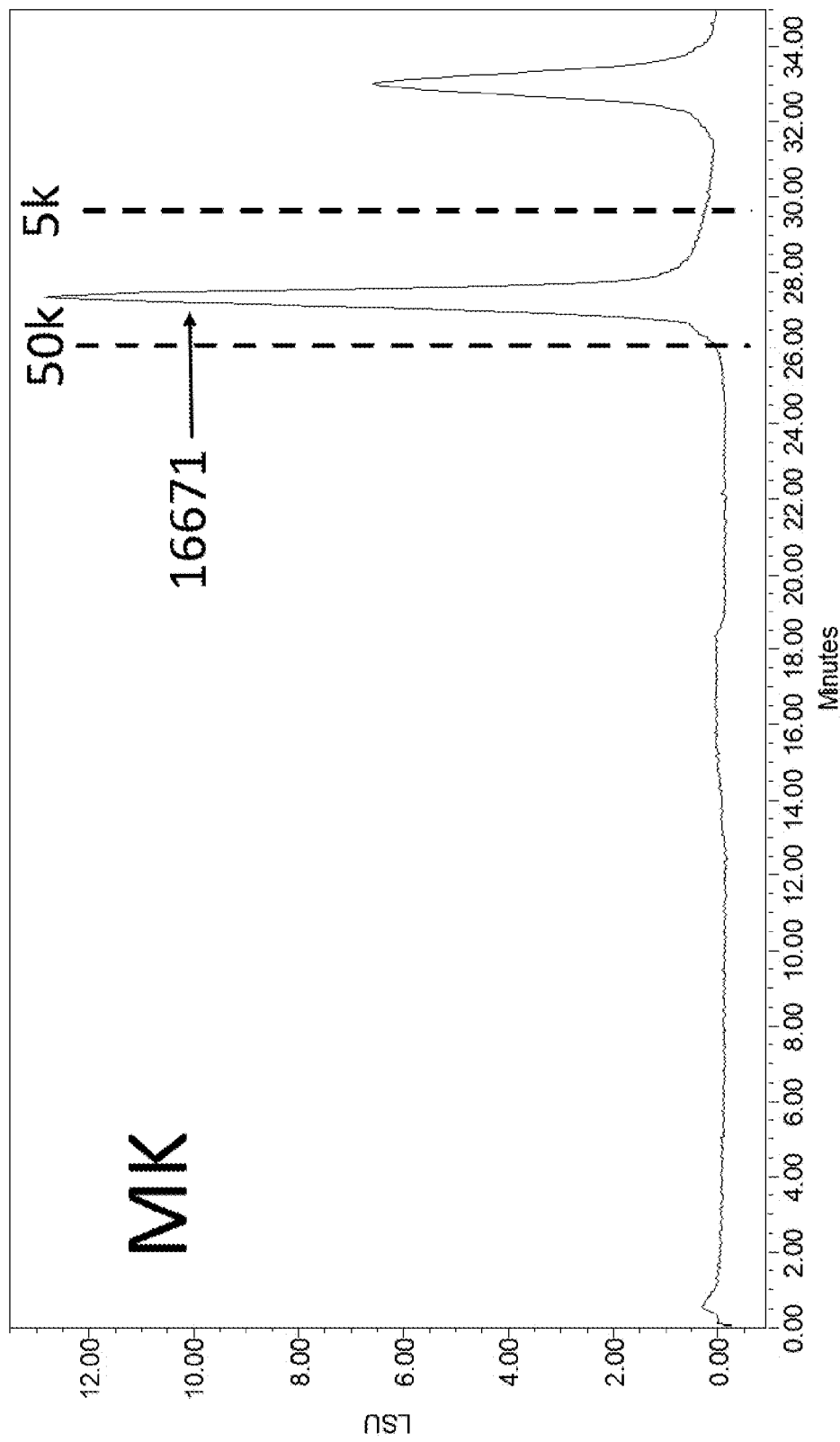
Figure 36:
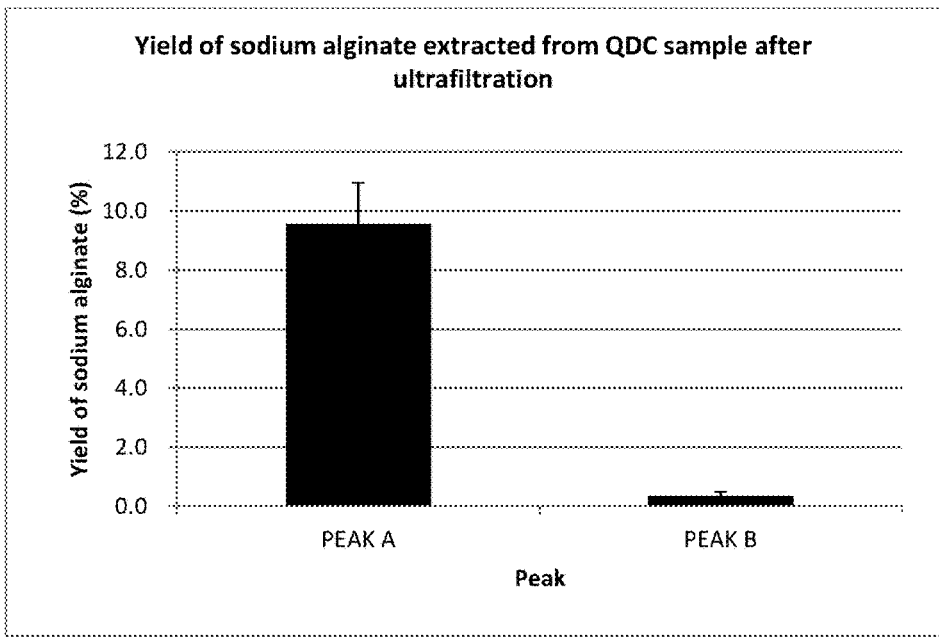
FIG. 36 depicts a table and graph showing the results of extracting β-glucan from *Undaria pinnatifida* (QDC) using optimized dual-solvent system and ultrafiltration in accordance with certain embodiments of the methods described herein; and a chromatograph showing the MWCO value membrane utilized and conditions described in Example 4.
Figure 36:
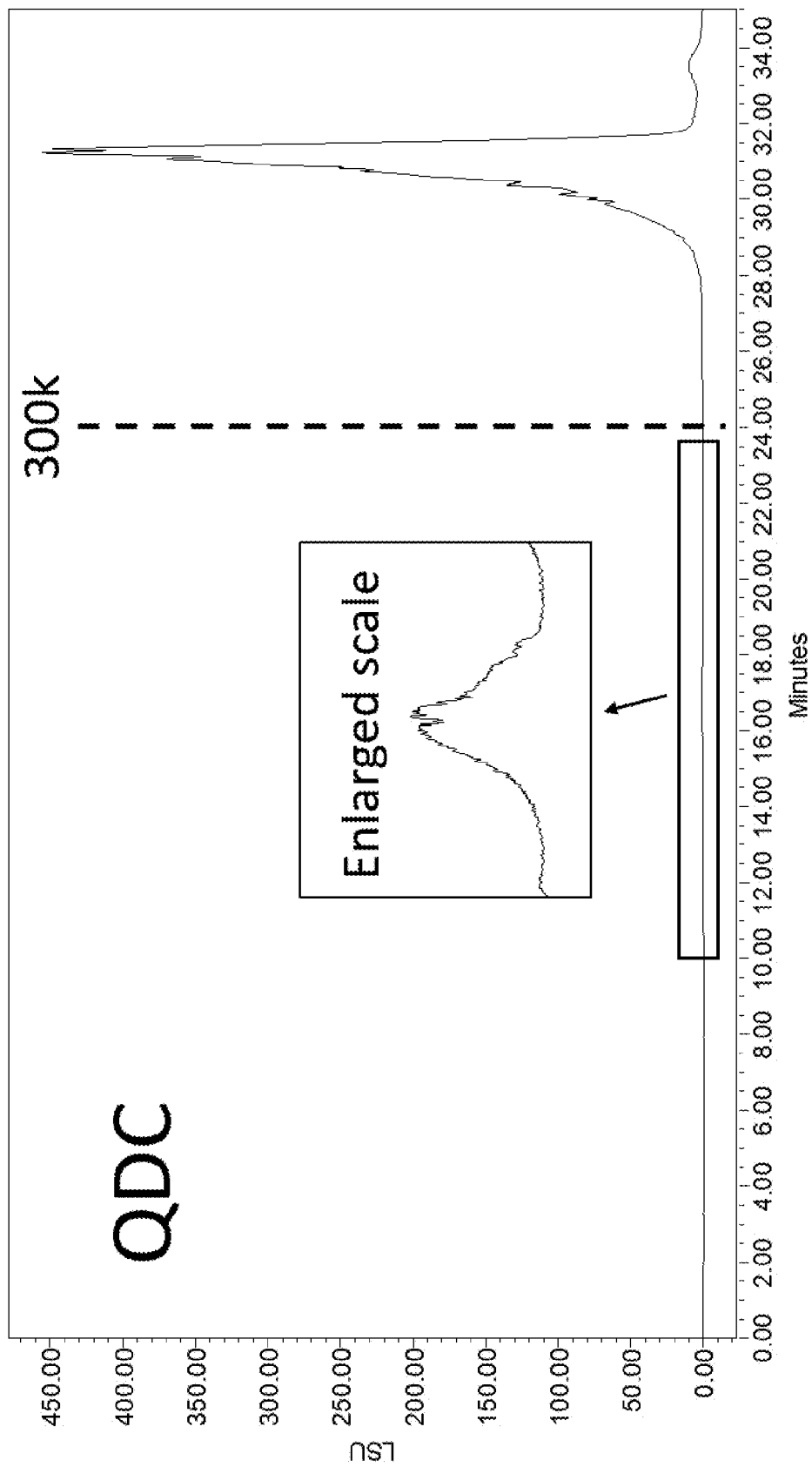

The step of irradiating the extraction mixture with microwave radiation can be conducted for between 5 minutes and 360 minutes, 30 minutes and 360 minutes, 30 minutes and 300 minutes, 30 minutes and 240 minutes, 30 minutes and 180 minutes, 60 minutes and 180 minutes, or 60 minutes and 120 minutes. As shown in FIGS. 15 and 16, the amount of polysaccharides recovered was highest when the step of irradiating the extraction mixture with microwave radiation was about 120 minutes.

After the step of irradiating the extraction mixture is complete, the extraction sample can optionally be cooled to room temperature.

Salts present in the extraction sample can optionally be removed by dialysis prior to ultrafiltration. Alternatively, the extraction sample can be directly subjected to purification by filtration though one or more MWCO membranes, wherein the salts present in the extraction sample can advantageously be removed by selecting a membrane with a MWCO value of about 500-1,000 Da. In this fashion, substantially all components in the extraction sample having a molecular weight below 500-1,000 Da are removed, which would effectively remove most salts that can be used in connection with the claimed method. Advantageously, use of a first membrane having a MWCO value of 500-1,000 Da allows the method to be conducted on a large scale without the need for a time consuming solvent intensive dialysis step.

The desired polysaccharides can be further concentrated by the selection of a membrane having a MWCO value of 10,000 Da or higher, 20,000 Da or higher, 30,000 Da or higher, 40,000 Da or higher, or 50,000 Da or higher. In certain embodiments, the membrane has a MWCO value between 10,000-70,000 Da, 10,000-60,000 Da, 10,000-50,000 Da, 20,000-50,000 Da, 30,000-50,000 Da, or 40,000-50,000 Da.

In certain embodiments, the extraction sample is subjected ultrafiltration with two membranes having MWCO values of between 500 to 1,000 Da and 10,000 to 50,000 Da.

In certain embodiments, the one or more membranes having one or more MWCO values are installed in tangential flow filtration system, ceramic ultrafiltration towers, and combinations thereof.

The extraction sample temperature during ultrafiltration can range from 23-60° C., 23-40° C., 40-50° C., 45-55° C. In certain embodiments, the extraction sample temperature during ultrafiltration is about 50° C.

The extraction sample pressure during ultrafiltration can range 10-40 psi, 10-30 psi, 10-20 psi, 20-30 psi, 25-35 psi. In certain embodiments, the extraction sample pressure during ultrafiltration is about 30 psi.

In certain embodiments, the membrane used for ultrafiltration has a MWCO value of 5,000 Da, extraction sample pressure during ultrafiltration is about 30 psi, and the extraction sample temperature during ultrafiltration is about 50° C.

In certain embodiments, the membrane used for ultrafiltration has a MWCO of 10,000 Da, extraction sample pressure during ultrafiltration is about 30 psi, and the extraction sample temperature during ultrafiltration is about 50° C.

In certain embodiments, the membrane used for ultrafiltration has a MWCO value of 50,000 Da, extraction sample pressure during ultrafiltration is about 10 to about 30 psi, and the extraction sample temperature during ultrafiltration is about 50° C.

In certain embodiments, the membrane used for ultrafiltration has a MWCO value of 300,000 Da, extraction sample pressure during ultrafiltration is about 10 to about 30 psi, and the extraction sample temperature during ultrafiltration is about 50° C.

EXAMPLE 1

Extraction and Purification of Polysaccharides from *Coriolus versicolor* by NAMI's Extraction Technology 30 grams of sample from *Coriolus versicolor* was blended by a blender (Blendtec CHEF 600). Dual solvent system (DSS) was prepared by dissolving 250 g of ammonium sulfate in 600 g of water, then added in 150 g of absolute ethanol. The DSS solution was stirred for 3 min. 0.75 g of blended sample was put into an extraction vessel. 30 mL of DSS was pipetted accurately into the vessel and mixed well with the sample. Sample mixture was extracted by microwave extractor at 95° C. for 2 h (additionally add 15 min heat up time).

For total polysaccharide assay, both the ethanol layer and water layer of sample extract was collected and tested by anthrone-sulphuric acid method. The extraction yield of total polysaccharide for *Coriolus versicolor* was 6.07%.

For beta-glucan assay, sample mixture was filtered by filter paper. 20 mL of D.I. water was used to wash the residue. The washing solution was then filtered and combined to the sample solution. A 20-cm long dialysis tube (MD55, MWCO: 500 Da) was prepared for sample dialysis. After dialysis, the sample solution was freeze dried to sample powder and then perform beta-glucan assay (Mushroom & Yeast: (1-3)(1-6) β-glucans, Megazyme). The extraction yield of beta-glucan for *Coriolus versicolor* was 2.097%.

EXAMPLE 2

Ultrafiltration Procedures for *Coriolus versicolor* Sample Solution

The sample solution was filtered through a 0.22 μm PES filter after extraction. A tangential flow filtration system (Minimate™ Tangential Flow Filtration Systems, Pall) with ultrafiltration membrane (MWCO: 10k) was used for the first ultrafiltration. The filtered sample solution was transferred and stirred in a feed tank which immersed in a 50° C. water bath. Ultrafiltration was performed until the feed tank remains around 10 mL of sample solution. 20 ml of D.I. water was then added into the tank. The ultrafiltration was continued until the feed tank remains around 10 mL of sample solution. 20 ml of D.I. water was added again into the tank. The filtrate (molecular weight <10k) and the retentate (molecular weight >10k) were collected. After that, ultrafiltration membrane (MWCO: 50k) was applied for second ultrafiltration of retentate (molecular weight >10k) with the same experimental procedures. Finally, the second filtrate (molecular weight between 50k and 10k) was collected.

The first filtrate and the second filtrate were concentrated and freeze dried to sample powder individually for beta-glucan assay, which performed using enzymatic kit (Mushroom & Yeast: (1-3)(1-6) β-glucans, Megazyme). The extraction yields of beta-glucan for the first filtrate and second filtrate were 0.962% and 1.245%, respectively.

Gel permeation chromatography was conducted using HPLC-ELSD equipped with Waters Ultrahydrogel® Linear Column for the first filtrate and the second filtrate. The molecular weight of the highest peak (Mp) of polysaccharides in the first filtrate and the second filtrate were 1129 and 9604 Da, respectively. The corresponding GPC chromatograms were shown in FIG. 1.

EXAMPLE 3

Extraction and Purification of Polysaccharides from *Undaria* by NAMI's Extraction Technology 30 grams of sample from *Undaria* was blended by a blender (Blendtec CHEF 600). Sample powder was passed through the sieve with 500-μm mesh. Dual solvent system (DSS) was prepared by dissolving 240 g of ammonium sulfate in 570 g of water, then added in 190 g of absolute ethanol. The DSS solution was stirred for 3 min. 0.75 g of blended sample was put into an extraction vessel. 30 mL of DSS was pipetted accurately into the vessel and mixed well with the sample. Sample mixture was extracted by microwave extractor at 80° C. for 1 h (additionally add 15 min heat up time).

For total polysaccharide assay, both the ethanol layer and water layer of sample extract was collected and tested by anthrone-sulphuric acid method. The extraction yield of total polysaccharide for *Undaria* was 1.79%.

For sodium alginate assay, sample mixture was centrifuged and supernatant was collected. 50 mL of D.I. water was used to wash the residue. The washing solution was then centrifuged and combined to the supernatant. A 25-cm long dialysis tube (MD55, MWCO: 500 Da) was prepared for sample dialysis. After dialysis, the sample solution was freeze dried to sample powder and then performed sodium alginate assay by HPLC/DAD. The extraction yield of sodium alginate for *Undaria* was 17.983%.

EXAMPLE 4

Ultrafiltration Procedures for *Undaria* Sample Solution

The sample solution was filtered through a 0.22 μm PES filter after extraction. A tangential flow filtration system (Minimate™ Tangential Flow Filtration Systems, Pall) with ultrafiltration membrane (MWCO: 300 k) was used for the first ultrafiltration. The filtered sample solution was transferred and stirred in a feed tank which immersed in a 50° C. water bath. Ultrafiltration was performed until the feed tank remains around 10 mL of sample solution. 20 ml of D.I. water was then added into the tank. The ultrafiltration was continued until the feed tank remains around 10 mL of sample solution. 20 ml of D.I. water was added again into the tank. The filtrate (molecular weight <300 k) and the retentate (molecular weight >300 k) were collected.

The filtrate and the retentate were concentrated and freeze dried to sample powder individually for sodium alginate assay, which performed by HPLC/DAD. The extraction yields of sodium alginate assay for the filtrate (molecular weight <300 k) and the retentate (molecular weight >300 k) were 0.347% and 9.548%, respectively.

Figure 2:
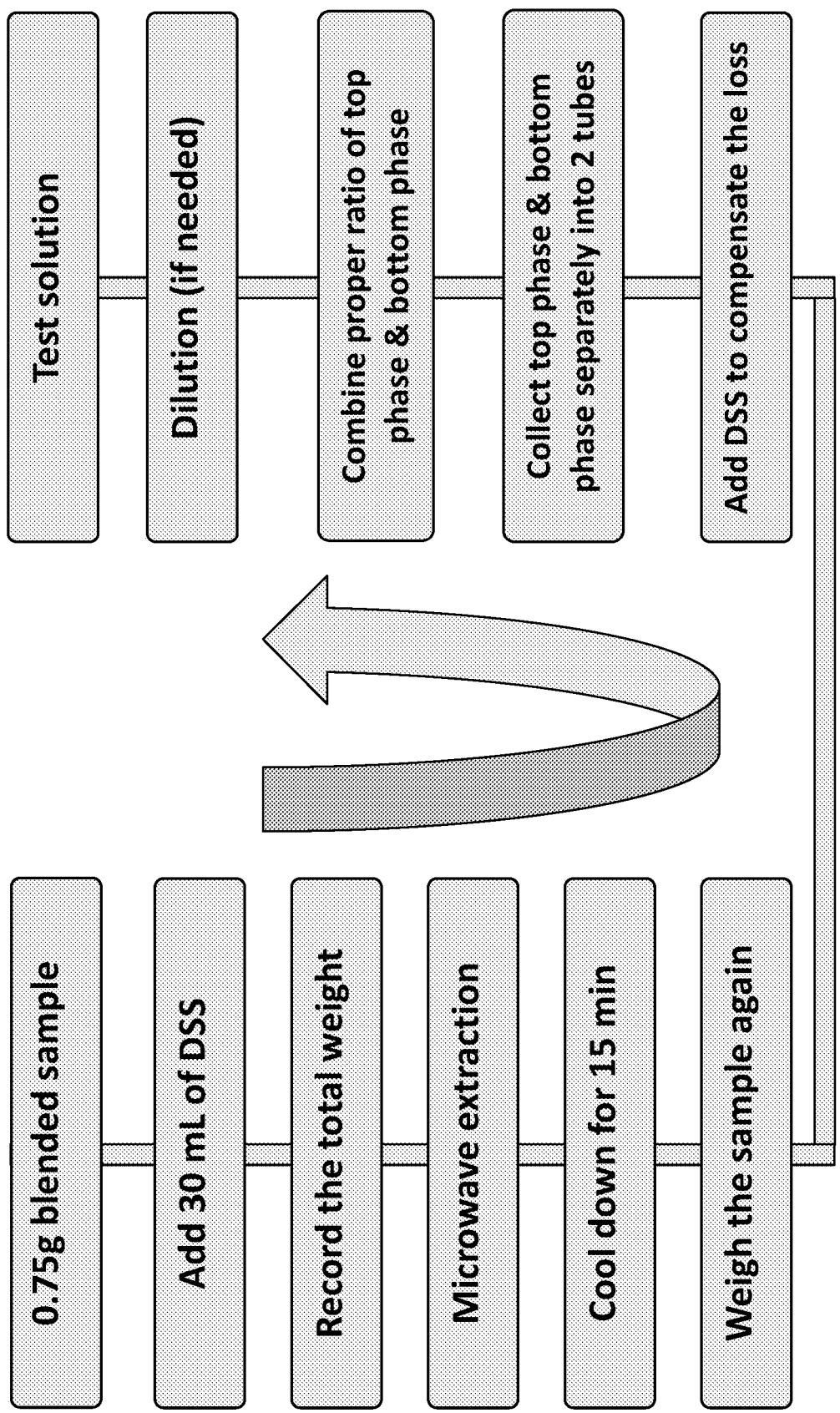
FIG. 2 depicts an exemplary flow chart for the extraction of polysaccharide from a botanical product in accordance with certain embodiments described herein.

Gel permeation chromatography was conducted using HPLC-ELSD equipped with Waters Ultrahydrogel® Linear Column for the filtrate and the retentate. The molecular weight of the highest peak (Mp) of polysaccharides in the filtrate was 1260 Da. The polysaccharides in the retentate were mainly divided into 2 groups. The group with a larger molecular size was out of the calibration range. The molecular weight of the highest peak (Mp) of the other group was 9972 Da. The corresponding GPC chromatograms were in FIG. 2.

EXAMPLE 5

Extraction and Purification of Polysaccharides from Rice Bran by NAMI's Extraction Technology 30 grams of sample from Rice Bran was blended by a blender (Blendtec CHEF 600). Sample powder was passed through the sieve with 500-μm mesh. Dual solvent system (DSS) was prepared by dissolving 210 g of ammonium sulfate in 600 g of water, then added in 190 g of absolute ethanol. The DSS solution was stirred for 3 min. 0.75 g of blended sample was put into an extraction vessel. 30 mL of DSS was pipetted accurately into the vessel and mixed well with the sample. Sample mixture was extracted by microwave extractor at 80° C. for 1 h (additionally add 15 min heat up time).

For total polysaccharide assay, both the ethanol layer and water layer of sample extract was collected and tested by anthrone-sulphuric acid method. The extraction yield of total polysaccharide for Rice Bran was 15.43%.

For beta-glucan assay, sample mixture was centrifuged and supernatant was collected. 20 mL of D.I. water was used to wash the residue. The washing solution was then centrifuged and combined to the supernatant. A 20-cm long dialysis tube (MD55, MWCO: 500 Da) was prepared for sample dialysis. After dialysis, the sample solution was freeze dried to sample powder and then perform beta-glucan assay (Mixed-linkage [(1-3)(1-4)] β-D-glucans, Megazyme). The extraction yield of beta-glucan for Rice Bran was 0.135%.

EXAMPLE 6

Ultrafiltration Procedures for Rice Bran Sample Solution

The sample solution was filtered through a 0.22 μm PES filter after extraction. A tangential flow filtration system (Minimate™ Tangential Flow Filtration Systems, Pall) with ultrafiltration membrane (MWCO: 5 k) was used for the first ultrafiltration. The filtered sample solution was transferred and stirred in a feed tank which immersed in a 50° C. water bath. Ultrafiltration was performed until the feed tank remains around 10 mL of sample solution. 20 ml of D.I. water was then added into the tank. The ultrafiltration was continued until the feed tank remains around 10 mL of sample solution. 20 ml of D.I. water was added again into the tank. The filtrate (molecular weight <5 k) and the retentate (molecular weight >5 k) were collected. After that, ultrafiltration membrane (MWCO: 50 k) was applied for second ultrafiltration of retentate (molecular weight >5 k) with the same experimental procedures. Finally, the second filtrate (molecular weight between 50k and 5 k) was collected.

The first filtrate and the second filtrate were concentrated and freeze dried to sample powder individually for beta-glucan assay, which performed using enzymatic kit (Mixed-linkage [(1-3)(1-4)] β-D-glucans, Megazyme). The extraction yields of beta-glucan for the first filtrate and second filtrate were 0.061% and 0.028%, respectively.

Figure 3:
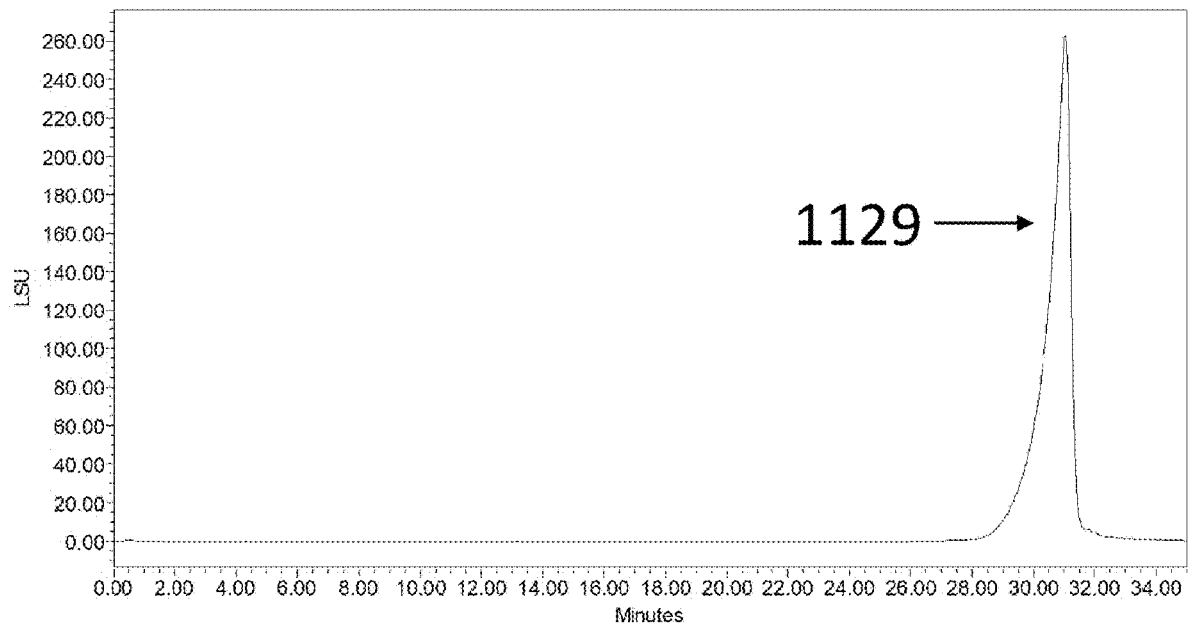
FIG. 3 depicts chromatographs of polysaccharides present in the first filtrate and the second filtrate from *Coriolus versicolor* extracted using certain embodiments of the method described herein. The peak is labeled with the observed molecular weight in the detection range.
Figure 3:
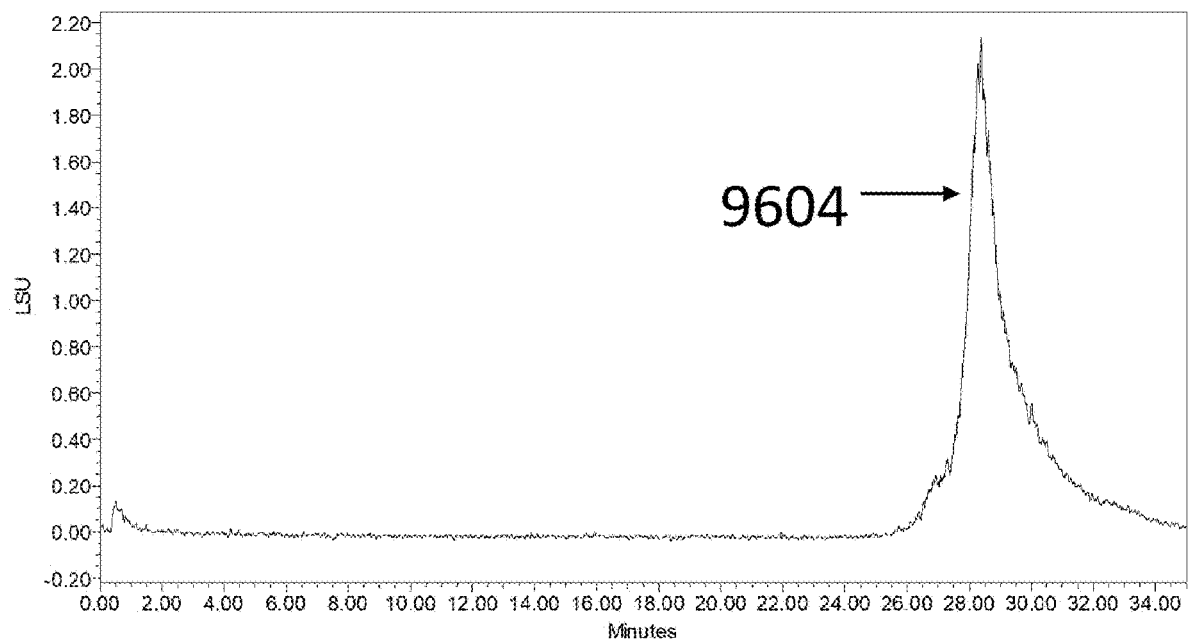
Figure 4:
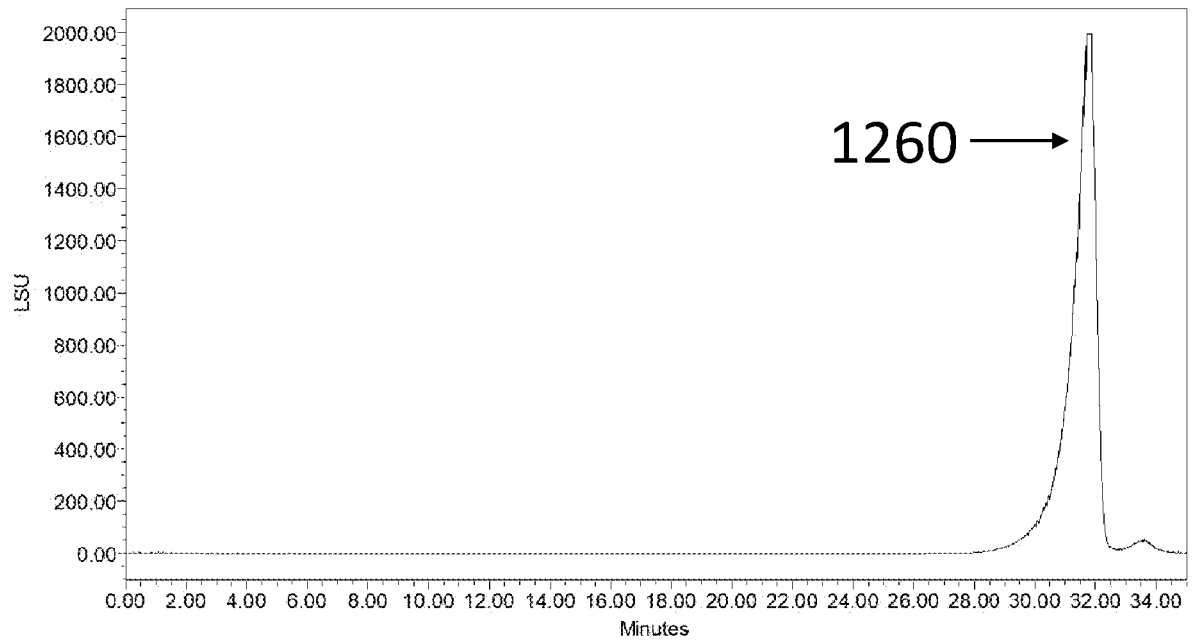
FIG. 4 depicts chromatographs of polysaccharides present in the filtrate and the retentate from *Undaria pinnatifida* extracted using certain embodiments of the method described herein. The labeled peak is labeled with the observed molecular weight of the major component of the peak. The peak is labeled with the observed molecular weight in the detection range.
Figure 4:
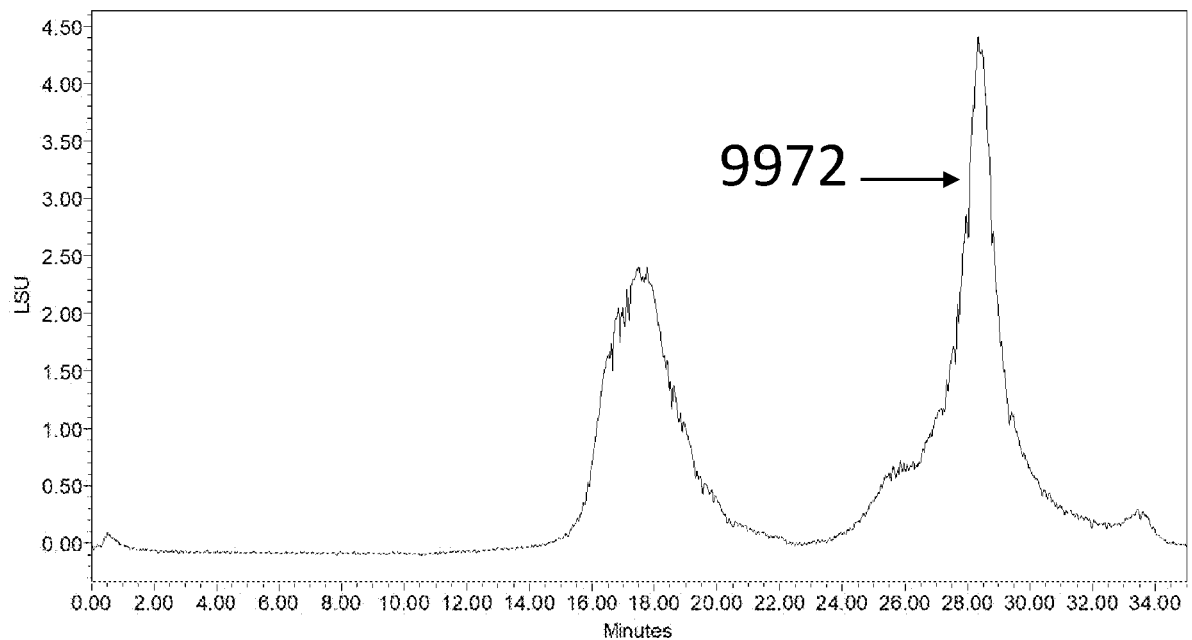
Figure 5:
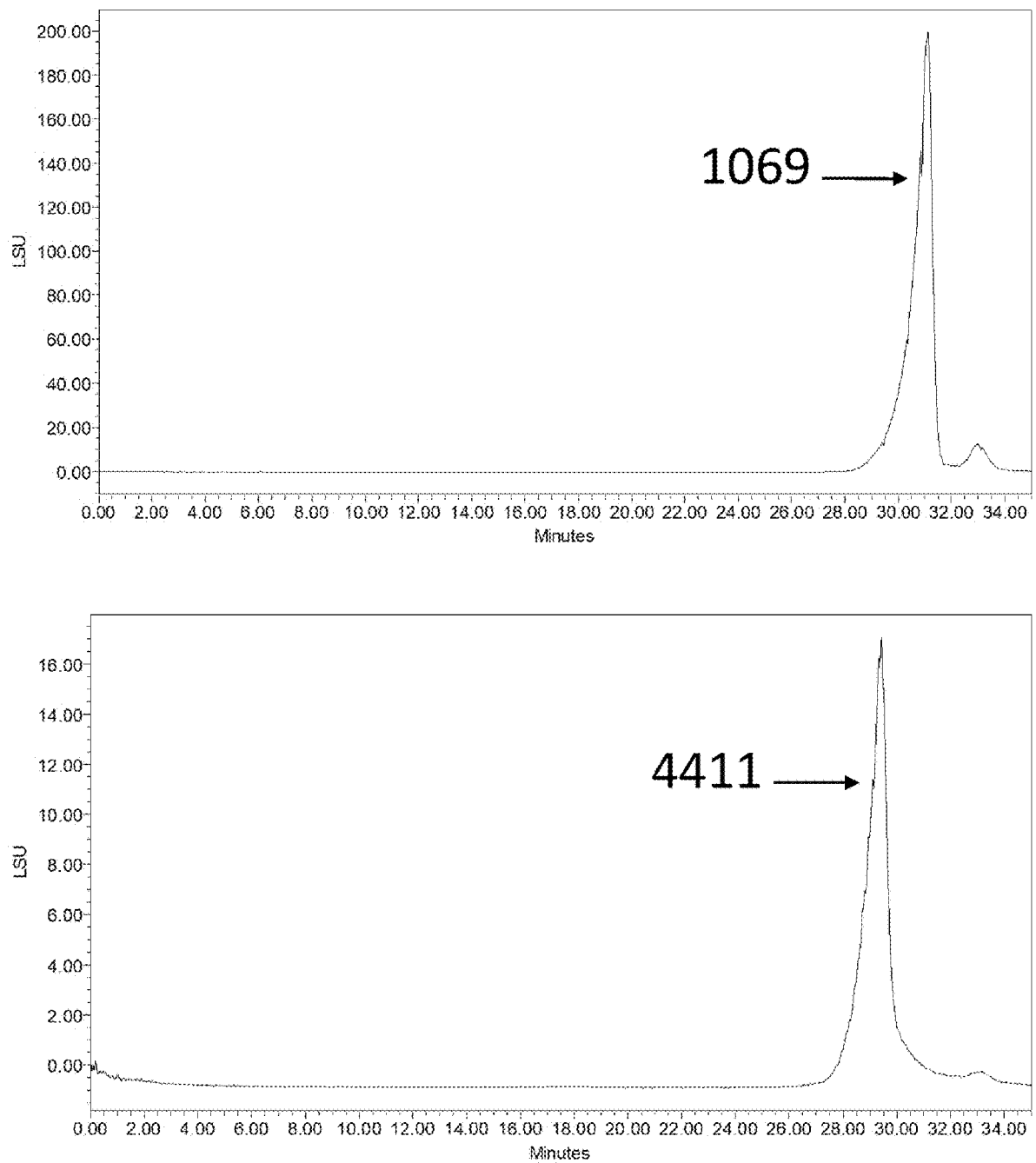
FIG. 5 depicts chromatographs of polysaccharides present in the first filtrate and the second filtrate from rice bran extracted using certain embodiments of the method described herein. The peak is labeled with the observed molecular weight in the detection range.

Gel permeation chromatography was conducted using HPLC-ELSD equipped with Waters Ultrahydrogel® Linear Column for the first filtrate and the second filtrate. The molecular weight of the highest peak (Mp) of polysaccharides in the first filtrate and the second filtrate were 1069 and 4411 Da, respectively. The corresponding GPC chromatograms were shown in FIG. 3.

COMPARATIVE EXAMPLE 1

Extraction and Purification of Polysaccharides from *Coriolus versicolor* by Conventional Extraction Method Blended sample was prepared in the same manner as that of Example 1. 0.75 g of blended sample was put into a round-bottomed flask. 30 mL of deionized water was used as the extraction solvent. Sample mixture was extracted by heating mantle at 95° C. for 2 h (not including the heat up time).

For total polysaccharide assay, the sample mixture was filtered by filter paper. 5 mL of filtrate was transferred into a beaker and 75 mL of absolute ethanol was added slowly with stirring. The sample was placed at 4° C. for overnight, and then centrifuged for 30 min. The precipitates was collected and dissolved in hot deionized water. The sample solution was centrifuged for 2 min and the supernatant was taken for test. Sample was tested by anthrone-sulphuric acid method. The extraction yield of total polysaccharide for *Coriolus versicolor* was 0.79%.

For beta-glucan assay, sample mixture was filtered by filter paper. 450 mL of absolute ethanol was added into the supernatant slowly with stirring. The sample was placed at 4° C. for overnight, and then centrifuged for 30 min. The precipitates was collected and dissolved in 30 mL of hot deionized water. A 15-cm long dialysis tube (MD55, MWCO: 500 Da) was prepared for sample dialysis. After dialysis, the sample solution was freeze dried to sample powder and then beta-glucan assay was performed (Mushroom & Yeast: (1-3)(1-6) β-glucans, Megazyme). The extraction yield of beta-glucan for *Coriolus versicolor* was 0.328%.

The extraction yield of total polysaccharide and beta-glucan in Examples 1 and Comparative Example 1 are summarized in Table 1.

TABLE 1

Extraction yield of total polysaccharide and beta-glucan in Example 1 and Comparative Example 1.

| | Total polysaccharide | | | β-glucan | | |
|---|---|---|---|---|---|---|
| Example | Mean (%) | SD (%) | Difference (%) | Mean (%) | SD (%) | Difference (%) |
| Comparative Example 1 | 0.79 | 0.27 | N/A | 0.328 | 0.169 | N/A |
| Example 1 | 6.07 | 0.47 | +672.85 | 2.097 | 0.018 | +538.51 |

COMPARATIVE EXAMPLE 2

Extraction and Purification of Polysaccharides from *Undaria* by Conventional Extraction Method Blended sample was prepared in the same manner as that of Example 3. 0.75 g of blended sample was put into a round-bottomed flask. 30 mL of deionized water was used as the extraction solvent. Sample mixture was extracted by heating mantle at 80° C. for 1 h (not including the heat up time).

For total polysaccharide assay, the experimental procedures and method were in the same manner as that of Comparative Example 1, except the volume of filtrate and absolute ethanol were changed to 2.5 mL and 37.5 mL, respectively. The extraction yield of total polysaccharide for *Undaria* was 0.80%.

For sodium alginate assay, the procedures of ethanol precipitation and dialysis were the same with that of Comparative Example 1. After dialysis, the sample solution was concentrated to 25 mL and then performed sodium alginate assay by HPLC/DAD. The extraction yield of sodium alginate for *Undaria* was 4.060%.

The extraction yield of total polysaccharide and sodium alginate in Examples 3 and Comparative Example 2 are summarized in Table 2.

TABLE 2

Extraction yield of total polysaccharide and sodium alginate in Example 3 and Comparative Example 2.

| | Total polysaccharide | | | Sodium alginate | | |
|---|---|---|---|---|---|---|
| Example | Mean (%) | SD (%) | Difference (%) | Mean (%) | SD (%) | Difference (%) |
| Comparative Example 2 | 0.80 | 0.05 | N/A | 4.060 | 0.575 | N/A |
| Example 3 | 1.79 | 0.11 | +123.20 | 17.983 | 4.422 | +342.97 |

COMPARATIVE EXAMPLE 3

Extraction and Purification of Polysaccharides from Rice Bran by Conventional Extraction Method Blended sample was prepared in the same manner as that of Example 5. 0.75 g of blended sample was put into a round-bottomed flask. 30 mL of deionized water was used as the extraction solvent. Sample mixture was extracted by heating mantle at 80° C. for 1 h (not including the heat up time).

For total polysaccharide assay, the experimental procedures and method were in the same manner as that of Comparative Example 1. The extraction yield of total polysaccharide for Rice Bran was 2.53%.

For beta-glucan assay, the procedures of ethanol precipitation and dialysis were the same with that of Comparative Example 1. After dialysis, the sample solution was freeze dried to sample powder and then beta-glucan assay was performed (Mixed-linkage [(1-3)(1-4)] β-D-glucans, Megazyme). The extraction yield of beta-glucan for Rice Bran was 0.018%.

The extraction yield of total polysaccharide and beta-glucan in Examples 5 and Comparative Example 3 are summarized in Table 3.

TABLE 3

Extraction yield of total polysaccharide and beta-glucan in Examples 5 and Comparative Example 3.

| | Total polysaccharide | | | β-glucan | | |
|---|---|---|---|---|---|---|
| Example | Mean (%) | SD (%) | Difference (%) | Mean (%) | SD (%) | Difference (%) |
| Comparative Example 3 | 2.53 | 1.56 | N/A | 0.018 | 0.013 | N/A |
| Example 5 | 15.43 | 0.62 | +510.56 | 0.135 | 0.004 | +638.75 |

COMPARATIVE EXAMPLE 4

Extraction and Purification of Polysaccharides from Rice Bran with Dual Solvent System by Conventional Extraction Method Blended sample was prepared in the same manner as that of Example 5. 0.75 g of blended sample was put into a round-bottomed flask. Dual solvent system (DSS) was prepared by dissolving 210 g of ammonium sulfate in 600 g of water, then added in 190 g of absolute ethanol. The DSS solution was stirred for 3 min. 0.75 g of blended sample was put into an extraction vessel. 30 mL of DSS was pipetted accurately into the vessel and mixed well with the sample. Sample mixture was extracted by heating mantle at 80° C. for 1 h (not including the heat up time).

For beta-glucan assay, the procedures of sample collection and dialysis were the same with that of Example 5. After dialysis, the sample solution was freeze dried to sample powder and then perform beta-glucan assay (Mixed-linkage [(1-3)(1-4)] β-D-glucans, Megazyme).

COMPARATIVE EXAMPLE 5

Extraction and Purification of Polysaccharides from Rice Bran with Water by Microwave Extraction Method Blended sample was prepared in the same manner as that of Example 5. 0.75 g of blended sample was put into a round-bottomed flask. 30 mL of deionized water was used as the extraction solvent. Sample mixture was extracted by microwave extractor at 80° C. for 1 h (additionally add 15 min heat up time).

For beta-glucan assay, the procedures of sample collection and dialysis were the same with that of Example 5. After dialysis, the sample solution was freeze dried to sample powder and then perform beta-glucan assay (Mixed-linkage [(1-3)(1-4)] β-D-glucans, Megazyme).

The extraction yield of beta-glucan in Examples 5 and Comparative Example 3, 4 & 5 are summarized in FIG. 29.

What is claimed is:

1. A method for extracting one or more polysaccharides from a sample comprising a botanical product, wherein the method comprises: combining the sample with an extraction solvent in a mass to volume ratio of the sample to the extraction solvent between 1:20 to 1:60, wherein the extraction solvent comprises ethanol and an aqueous solvent comprising at least one ammonium salt, wherein the concentration of the ammonium salt is 20-25% m/v, thereby forming an extraction mixture;
    irradiating the extraction mixture with microwave radiation for 60-120 minutes resulting in the temperature of the extraction mixture to change to between 80 to 95° C. and the extraction of at least a portion of the one or more polysaccharides from the sample into the extraction solvent and thereby forming an extraction sample;
    contacting the extraction sample with one or more membranes having one or more MWCO values thereby forming a retentate enriched in the one or more polysaccharides; and optionally drying the retentate thereby extracting the one or more polysaccharides, wherein the botanical product is Coriolus versicolor, Undaria pinnatifida, or a rice bran and the one or more polysaccharides are selected from the group consisting of β-glucan and sodium alginate.

2. The method of claim 1, wherein the at least one ammonium salt is selected from the group consisting of ammonium sulfate, ammonium bisulfate, ammonium carbonate, ammonium bicarbonate, ammonium citrate, ammonium chloride, ammonium bromide, ammonium acetate, and ammonium formate.

3. The method of claim 1, wherein the alcoholic solvent and the aqueous solvent are present in a volume ratio of 15:85 to 30:70.

4. The method of claim 1 further comprising the step of milling the botanical product thereby forming a milled botanical product and optionally sieving the milled botanical product thereby forming the sample.

5. The method of claim 1, wherein the step of drying the retentate comprises freeze drying, spray drying, fluid bed drying or direct oven heat drying.

6. The method of claim 1, wherein the one or more membranes have a MWCO value selected from the group consisting of between 500 to 1,000 Da and 10,000 to 50,000 Da.

7. The method of claim 1, wherein the method comprises: combining the sample with an extraction solvent in a mass to volume ratio of the sample to the extraction solvent between 1:40 to 1:60, wherein the extraction solvent comprises ethanol and an aqueous solvent comprising at least one ammonium sulfate, wherein the ethanol and aqueous solvent are present in a volume ratio of 19:81 to 21:79 and concentration of the ammonium salt is 20-25% m/v, thereby forming an extraction mixture;
    irradiating the extraction mixture with microwave radiation for 60-120 minutes resulting in the temperature of the extraction mixture to change to between 80 to 95° C. and the extraction of at least a portion of the one or more polysaccharides from the sample into the extraction solvent and thereby forming an extraction sample; contacting the extraction sample with one or more membranes, wherein the one or more membranes have a MWCO value selected from the group consisting of between 500 to 1,000 Da and 10,000 to 50,000 Da; thereby forming a retentate enriched in the one or more polysaccharides; and optionally drying the retentate thereby extracting the one or more polysaccharides, wherein the botanical product is *Coriolus versicolor, Undaria pinnatifida*, or a rice bran and the one or more polysaccharides are selected from the group consisting of β-glucan and sodium alginate.

* * * * *